US 6,615,134 B2

(12) United States Patent
Ando

(10) Patent No.: US 6,615,134 B2
(45) Date of Patent: Sep. 2, 2003

(54) DATA COMMUNICATION SYSTEM AND METHOD, AND MOBILE BODY APPARATUS

(75) Inventor: Kazutaka Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/031,849

(22) PCT Filed: May 23, 2001

(86) PCT No.: PCT/JP01/04334
§ 371 (c)(1),
(2), (4) Date: Jun. 3, 2002

(87) PCT Pub. No.: WO01/91502
PCT Pub. Date: Nov. 29, 2001

(65) Prior Publication Data
US 2002/0173907 A1 Nov. 21, 2002

(30) Foreign Application Priority Data
May 25, 2000 (JP) ........................................ 2000-155398

(51) Int. Cl.$^7$ .............................................. G01C 21/30
(52) U.S. Cl. .................... 701/209; 701/23; 701/24; 701/25; 701/207; 455/510; 455/517
(58) Field of Search .......................... 701/23, 24, 25, 701/33, 35, 200, 207, 209; 455/502, 510, 517, 524, 525

(56) References Cited

U.S. PATENT DOCUMENTS 5,260,944 A * 11/1993 Tomabechi .................. 370/347
5,396,496 A * 3/1995 Ito et al. ...................... 370/314

FOREIGN PATENT DOCUMENTS

| JP | 6-334595 | 12/1994 |
| JP | 8-294171 | 11/1996 |
| JP | 9-257498 | 10/1997 |
| JP | 10-75479 | 3/1998 |
| JP | 2000-20884 | 1/2000 |

* cited by examiner

Primary Examiner—Gertrude Arthur
(74) Attorney, Agent, or Firm—Frommer Lawrence & Haug LLP; William S. Frommer; Gordon Kessler

(57) ABSTRACT

The present invention relates to a data communication system in which a first request signal containing position information is transmitted from a first mobile unit (6) to a base station (2), and in which the base station (2) searches for a second mobile unit (5) in accordance with the position information contained in the first request signal, then transmits a second request signal to the second mobile unit (5), and returns data returned from the second mobile unit (5) to the first mobile unit (6).

59 Claims, 20 Drawing Sheets

DATA COMMUNICATION SYSTEM AND METHOD, AND MOBILE BODY APPARATUS

TECHNICAL FIELD

This invention relates to a data communication system and method and a mobile device which are suitable for a mobile communication system using a mobile terminal as a communication terminal, and also relates to a program storage, medium in, which a program used for these system and method is stored.

BACKGROUND ART

Conventionally, a moving route display device or a traveling route display device has been practically used in which the positions of various mobile units such as automobiles, ships, aircrafts and the like are traced and, displayed on a map displayed on, for example, a color display screen of a cathode ray tube (CRT) or a liquid crystal display on the basis of position information obtained by a position measuring system such as the GPS (Global Positioning System). The GPS is a system for detecting the present absolute position and traveling direction of an automobile or the like, specifically, a GPS receiving terminal carried on an automobile or the like, by using radio waves from 24 geostationary satellites (GPS satellites) launched by the U.S. Department of Defense. Each GPS satellite is sending time information, orbit information and the like. A GPS receiving terminal receives radio waves from four satellites and calculates the distance from each of the satellites, and thus can specify the position and time of the terminal itself from the longitude, latitude and altitude. As a so-called car navigation system, which is a system for displaying the traveling route of an automobile, there exists a self-contained navigation system using a geomagnetic sensor, a car speed sensor, map matching and the like, or a system using so-called beacon, signpost and the like and also using a car speed sensor, map matching, a direction sensor and the like, as well as the GPS.

Of the above-described conventional moving route display devices, in a car navigation system which is becoming particularly popular recently, it is possible to display not only a traveling route that is already taken by an automobile (mobile unit) but also a route to be taken by, the automobile, for example, a route to a certain destination, and also to guide the user on the route to the destination using voices and images.

The conventional car navigation system does not use any means for learning the, actual state of a position on the route to be taken by the automobile, that is, the position of the automobile after the lapse of a predetermined time, for example, means for obtaining an image and sound on the periphery of the position. Although there exists a service for providing traffic congestion information on the route of the mobile unit linked with the conventional car navigation system, for example, so-called VICS (Vehicle Information and Communication System), the traffic congestion information is about a predetermined place and the state of other places than the predetermined place cannot be known. This applies not only to the car navigation system but also to other moving route display devices.

Meanwhile, in various mobile communication systems which enable data transmission/reception by mobile terminals having a communication function, if data indicating the state at a position where a mobile terminal A exists, for example, image data, is sent from the mobile terminal A to another mobile terminal B, the mobile terminal B can learn the state on the position where-the mobile terminal A exists, for example, an image thereof.

To realize this, the user of the mobile terminal A and the user of the mobile terminal B must know each other or must have determined in advance to send/receive data to/from each other. If the user of the mobile terminal B wants to know the actual state at a position on the route to be taken by the mobile terminal B, the mobile terminal A must have reached that position first. Moreover, if the user of the mobile terminal B wants to know the actual states of a plurality of different positions on the route to be taken by the mobile terminal B, a plurality of other mobile terminals must have been arranged at the respective positions. Such arrangements cannot be realized by any means, in consideration of the case where the route to be taken by the mobile terminal B might be changed.

DISCLOSURE OF THE INVENTION

In view of the foregoing status of the art, it is an object of the present invention to provide a data communication system and method and a mobile device which enable easy acquisition of the state of a desired position on a route to be taken by a certain mobile terminal, that is, provision of information acquired by a mobile terminal existing at a certain position to a mobile terminal at another position when necessary, and also to provide a program used for these system and method.

A data communication system according to the present invention comprises: a first mobile unit having first transmission/reception means for transmitting a first request signal containing position information to a base station and receiving data corresponding to the first request signal from the base station; a base station having search means for searching for a second mobile unit in, accordance with the position information contained in the first request signal, and second transmission/reception means for receiving the first request signal, transmitting a second request signal to the second mobile unit thus searched for, and returning data returned from the second mobile unit to the first mobile unit; and a second mobile unit having input means for inputting data, and third transmission/reception means for receiving the second request signal and returning the data inputted by the input means in accordance with the second request signal to the base station.

In this case, the base station has storage means for storing the data returned from the second mobile unit, and the storage means stores a plurality of route information on which the first mobile unit traveled in the past. The search means of the base station extracts route information which overlaps the position information contained in the first request signal, from the plurality of route information stored in the storage means, then predicts a traveling route of the first mobile unit on the basis of the extracted route information, and searches for the second mobile unit by using the predicted traveling route.

Another data communication system according to the present invention comprises: a first mobile unit having first transmission/reception means for transmitting a first request signal containing position information to a base station and, receiving data corresponding to the first request signal; a base station having search means for searching for a second mobile unit in accordance with the position information contained in the first request signal, and second transmission/reception means for receiving the first request signal and transmitting a second request signal containing information related to the first mobile unit to the second, mobile unit thus searched for; and a second mobile unit having input means for inputting data, and third transmission/reception means for receiving the second request signal and returning the data inputted by the input means in accordance with the second request signal to the first mobile unit.

Another data communication system according to the present invention comprises: a first mobile unit having first transmission/reception means for transmitting a first request signal containing position information to a base station and receiving data corresponding to the first request signal from the base station; a base station having search means for searching for a second mobile unit in accordance with the position information contained in the first request signal, second transmission/reception means for receiving the first request signal, transmitting a second request signal to the second mobile unit thus searched for, and returning data returned from the second mobile unit to the first mobile unit, storage means for storing accounting information of users corresponding at least to the first and second mobile, units, and control means for performing control to update the accounting information of the users corresponding to the first and second mobile units stored by the storage means; and a second mobile unit having input means for inputting data, and third transmission/reception means for receiving the second request signal and returning the data inputted by the input means in accordance with the second request signal to the base station.

A mobile device according to the present invention comprises: position information acquisition means for acquiring position information; signal generation means for generating a first request signal containing the position information; input means for inputting data; and communication means for communicating a signal to/from an external device. When requesting data from the external device, the communication means of this mobile device transmits the first request signal containing the position information to the external device and receives data returned from the external device in accordance with the first request signal. When providing data to the external device, the communication means receives a second request signal transmitted from the external device and returns data inputted by the input means in accordance with the second request signal to the external device.

Another mobile device according to the present invention comprises: position information acquisition means for acquiring position information; signal generation means for generating a first request signal containing the position information; input means for inputting data; and communication means for communicating a signal to/from an external device or another mobile device. When requesting data obtained by another mobile device, the communication means of this mobile device transmits the first request signal containing the position information to the external device and receives data returned from another mobile device in accordance with the first request signal. When providing data to another mobile device, the communication means receives a second, request signal containing information related to another mobile device transmitted from the external device and returns data inputted by the input means in accordance with the second request signal to another mobile device.

A server device used in a data communication system according to the present invention comprises: communication means capable of communicating a signal to/from a plurality of mobile units; holding means for holding information related to the plurality of mobile units; search means for searching for a second mobile unit corresponding to position information contained in a first request signal transmitted from a first mobile unit by using the information related to the plurality of mobile units held by the holding means; and generation means for generating a second request signal to be transmitted to the second mobile unit thus searched for; wherein the second request signal is transmitted to the second mobile unit thus searched for and data returned from the second mobile unit is returned to the first mobile unit.

Another server device according to the present invention comprises: communication means capable of communicating a signal to/from a plurality of mobile units; holding means for holding information related to the plurality of mobile units; search means for searching for a second mobile unit corresponding to position information contained in a first request signal transmitted from a first mobile unit by using the information related to the plurality of mobile units held by the holding means; and generation means for generating a second request signal containing information related to the first, mobile unit which is to be transmitted to the second mobile unit thus searched for, wherein the second request signal is transmitted to the second mobile unit thus searched for.

Another server device according to the present invention comprises: communication means capable of communicating a signal to/from a plurality of mobile units; holding means for holding information related to the plurality of mobile units; search means for searching for a second mobile unit corresponding to position information contained in a first request signal transmitted from a first mobile unit by using the information related to the plurality of mobile units held by the holding means; generation means for generating a second request signal to be transmitted to the second mobile unit thus searched for; storage means for storing accounting information of users corresponding at least to the first and second mobile units; and control means for performing control to update the accounting information of the users corresponding to the first and second mobile units stored by the storage means. The control means updates the accounting information of the users corresponding to the first and second mobile units on the basis of data returned from the second mobile unit in accordance with the second request signal and data transmitted to the first mobile unit in accordance with the first request signal.

A data communication system according to the present invention is adapted for carrying out communication among a first mobile unit, a second mobile unit and a base station. The first mobile unit has first communication, means for transmitting a first request signal containing the position information of the first mobile unit to the base station and receiving data, corresponding to the first request signal from the base station. The base station has prediction means for predicting the position of the first mobile unit after a predetermined time from the position information of the first mobile unit contained in the first request signal, search means for searching for the second mobile unit on the periphery of the position of the first mobile unit after the predetermined time predicted by the prediction means, and second communication means for receiving the first request signal, transmitting a second request signal to the second mobile unit thus searched for, and returning image data returned from the second mobile unit to the first mobile unit. The second mobile unit has image pickup means for picking up an image of an external object and outputting image data, and third communication means for receiving the second request signal and returning the image data outputted from the image pickup means to the base station.

A data communication method according to the present invention comprises the steps of: transmitting a first request signal containing position information from a first mobile unit to a base station; searching for a second mobile unit in accordance with the position information contained in the first request signal at the base station; transmitting a second request signal from the base station to the second mobile unit thus searched for; returning data inputted in accordance with the second request signal from the second mobile unit to the base station; and transmitting the data returned from the second mobile unit to the base station in accordance with the second request signal, from the base station to the first mobile unit as data corresponding to the first request signal.

Another data communication method according to the present invention comprises the steps of: transmitting a first request signal containing position information from a first mobile unit to a base station; searching for a second mobile unit in accordance with the position information contained in the first request signal at the base station; transmitting a second request signal from the base station to the second mobile unit thus searched for; returning data inputted in accordance with the second request signal from the second mobile unit to the base station; transmitting the data returned from the second mobile unit to the base station in accordance with the second request signal, from the base station to the first mobile unit as data corresponding to the first request signal; and updating accounting information of users corresponding to the first and second mobile units on the basis of the data returned from the second mobile unit in accordance with the second request signal and the data transmitted to the first mobile unit in accordance with the first request signal.

Another data communication method according to the present invention comprises the steps of: searching for a second mobile unit corresponding to position information contained in a first request signal transmitted from a first mobile unit in accordance with information related to a plurality of mobile units; generating a second request signal to be transmitted to the second mobile unit thus searched for; transmitting the second request signal to the second mobile unit thus searched for; and transmitting data returned from the second mobile unit to the first mobile unit.

Another data communication method according to the present invention comprises the steps of: searching for a second mobile unit corresponding to position information contained in a first request signal transmitted from a first mobile unit in accordance with information related to a plurality of mobile units; generating a second request signal to be transmitted to the second mobile unit thus searched for; and updating accounting information of users corresponding to the first and second mobile units stored in storage means on the basis of data returned from the second mobile unit in accordance with the second request signal and data transmitted to the first mobile unit in accordance with the first request signal.

According to the present invention, there is also provided a program which is readable by information processing means, and a program storage medium for storing this program. The program stored in the storage medium comprises: a step of transmitting a first request signal containing position information from a first mobile unit to a base station; a step of searching for a second mobile unit in accordance with the position information contained in the first request signal at the base station; a step of transmitting a second request signal from the base station to the second mobile unit thus searched for; a step of returning data inputted in accordance with the second request signal from the second mobile unit to the base station; and a step of transmitting the data returned from the second mobile unit to the base station in accordance with the second request signal, from the base station to the first mobile unit as data corresponding to the first request signal.

Another program stored in a program storage medium according to the present invention comprises: a step of transmitting a first request signal containing position information from a first mobile unit to a base station; a step of searching for a second mobile unit in accordance with the position information contained in the first request signal at the base station; a step of transmitting a second request signal from the base station to the second mobile unit thus searched for; and a step of transmitting data inputted in accordance with the second request signal from the second mobile unit to the first mobile unit as data corresponding to the first request signal.

Another program stored in a program storage medium according to the present invention comprises: a step of transmitting a first request signal containing position information from a first mobile unit to a base station; a step of searching for a second mobile unit in accordance with the position information contained in the first request signal at the base station; a step of transmitting a second request signal from the base station to the second mobile unit thus searched for; a step of returning data inputted in accordance with the second request signal from the second mobile unit to the base station; a step of transmitting the data returned from the second mobile unit to the base station in accordance with the second request signal, from the base station to the first a mobile unit as data corresponding to the first request signal; and a step of updating accounting information of users corresponding to the first and second mobile units on the basis of the data returned from the second mobile unit in accordance with the second request signal and the data transmitted to the first mobile unit in accordance with the first request signal.

Another program stored in a program storage medium according to the present invention comprises: when requesting data obtained by another mobile device, a step, of acquiring position information; a step of transmitting a first request signal containing position information to an external device; and a step of receiving the data transmitted from said another mobile device in accordance with the first request signal; and when providing data to another mobile device, a step of receiving a second request signal containing information related to another mobile unit transmitted from the external device; and a step of returning data inputted in accordance with the second request signal to said another mobile device.

Another program stored in a program storage medium according to the present invention comprises: a step of searching for a second mobile unit corresponding to position information contained in a first request signal transmitted from a first mobile unit in accordance with information related to a plurality of mobile units; a step of generating a second request signal containing information related to the first mobile unit to be transmitted to the second mobile unit thus searched for; and a step of transmitting the second request signal to the second mobile unit thus searched for.

Another program stored in a program storage medium according to the present invention comprises: a step of searching for a second mobile unit corresponding to position information contained in a first request signal transmitted from a first mobile unit in accordance with information related to a plurality of mobile units a step of generating a second request signal to be transmitted to the second mobile unit thus searched for; and a step of updating accounting information of users corresponding to the first and second mobile units stored in storage means on the basis of data returned from the second mobile unit in accordance with the second request signal and data transmitted to the first mobile unit in accordance with the first request signal.

The other objects and specific advantages of the present invention will be clarified by the following description of embodiments.

BEST MODE FOR CARRYING OUT THE INVENTION

A data communication system to which the present invention is applied will now be described with reference to the drawings.

Figure 1:
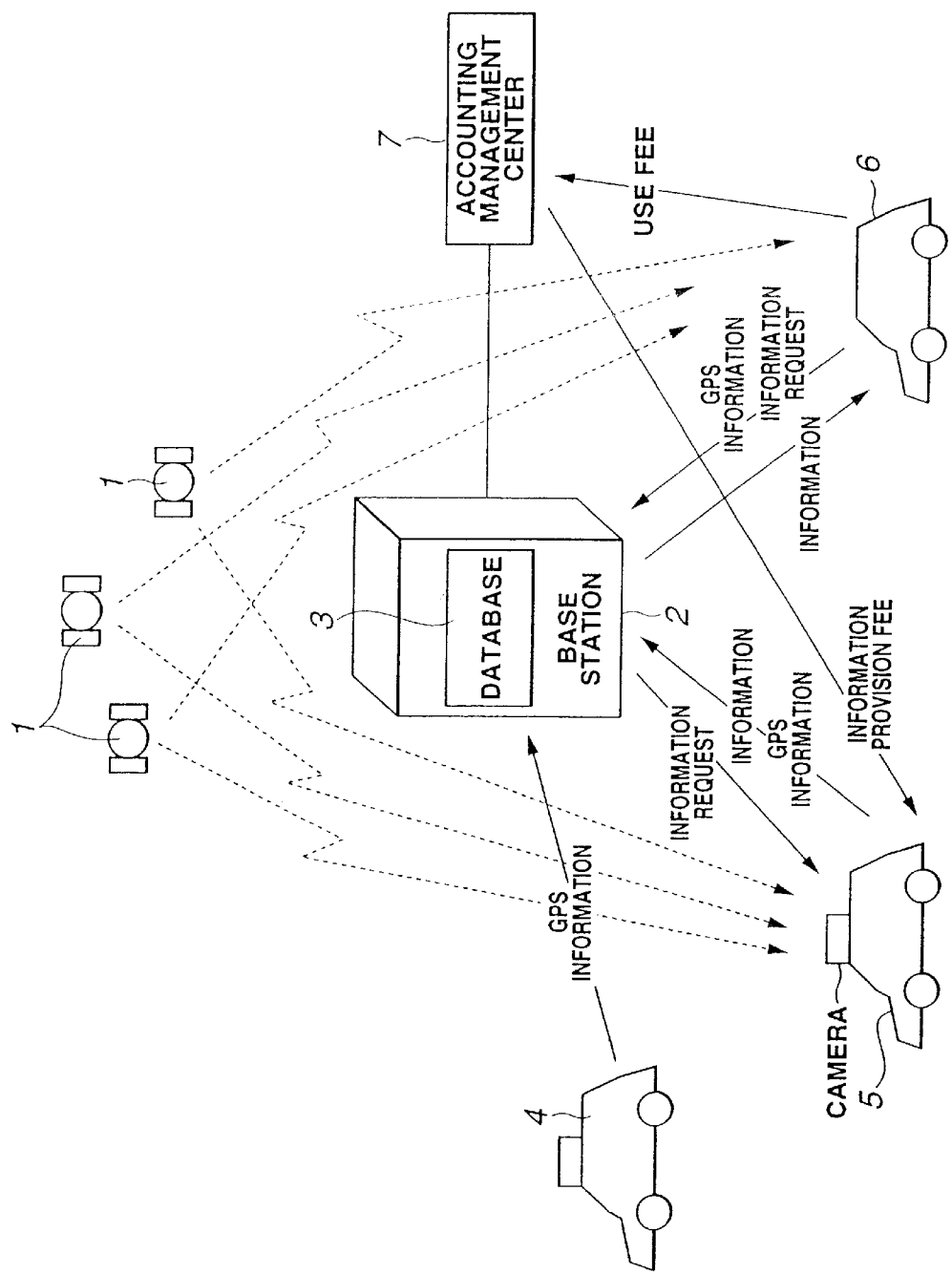
FIG. 1 is a view showing the schematic structure of a first example of the data communication system according to the present invention.

The data communication system to which the present invention is applied has a plurality of mobile stations 4 to 6, which are mobile terminals provided on mobile units, and a base station 2 for transmitting/receiving data to/from the mobile stations 4 to 6 and thus relaying the data, as shown in FIG. 1. Moreover, an accounting management center 7 is provided, if necessary. Although only three mobile stations 4 to 6 are shown in the example of FIG. 1, the number of mobile stations is not limited to three and more mobile stations may exist. Moreover, though only one base station 2 is provided in the example of FIG. 1, a plurality of base stations may be provided. As for the accounting management center 7, only one accounting management center is preferred in order to collectively manage accounting information, which will be described later. However, a plurality of accounting management centers may be provided.

As the mobile stations 4 to 6, mobile terminals which can be carried by walkers or mobile terminals carried on vehicles such as an automobile, motorcycle, bicycle, airplane, helicopter, train, ship and the like may be used. In the following description, a mobile terminal carried on an automobile is used as an example. In this example, the mobile terminal carried on the automobile has a car navigation function makes it possible to receive radio waves from a GPS satellite 1, then find the position of the automobile itself (the terminal itself), the traveling route and the traveling direction, and display such information together with a map showing the vicinity of the position of the automobile. The mobile terminal also has at least a transmitting/receiving unit for transmitting/receiving data to/from the base station 2, and an information acquiring unit for acquiring images, sounds and other information when necessary. The specific structure and operation of the mobile terminal (mobile station) of this example will be described later.

Each mobile station operates, for example, as a mobile station in which the user explicitly shows the intention to provide information acquired by the information acquiring unit to another user (i.e., the mobile station 4 in the example of FIG. 1, which is hereinafter suitably referred to as information providing candidate terminal 4), or as a mobile station in which the user explicitly shows a request for acquiring information related to the traveling direction of the user's automobile, for example, an image of a position to be reached by the user's automobile in the future (i.e., the mobile station 6 in the example of FIG. 1, which is hereinafter suitably referred to as information requesting terminal 6), or as a mobile station which provides information acquired by the information acquiring unit to another user (i.e., the mobile station 5 in the example of FIG. 1, which is hereinafter suitably referred to as information providing terminal 5). It is preferred that each mobile station has all the three functions of an information providing candidate terminal, an information requesting terminal and an information providing terminal. However, each mobile station may have only the functions of an information providing candidate terminal and an information providing terminal. The information providing candidate terminal must have the function of an information providing terminal.

Figure 2:
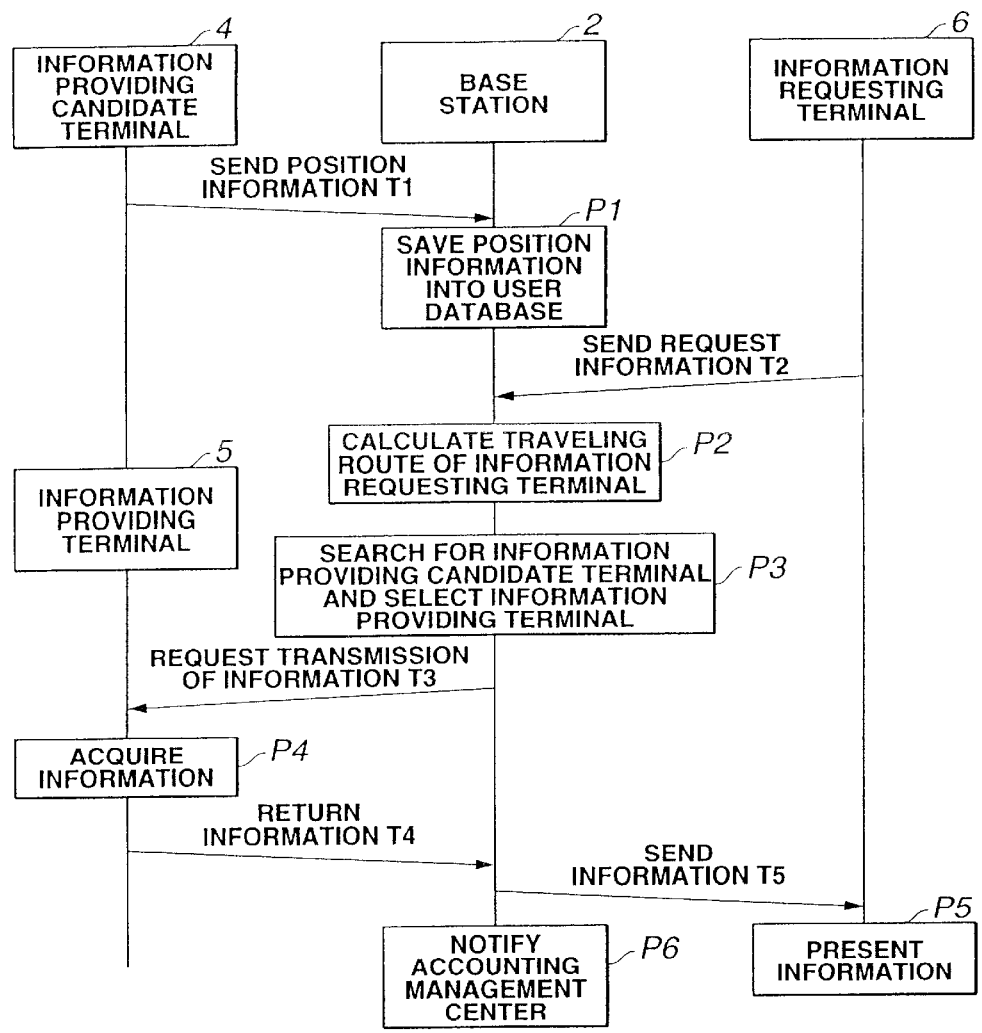
FIG. 2 is a view used for explaining the flow of data transmission/reception processing in the data communication system shown in FIG. 1.

When the user explicitly shows the intention to provide information acquired by the information acquiring unit to another user, the information providing candidate terminal 4 transmits information about the position of its automobile to the base station 2, as the processing T1 shown in FIG. 2. The information providing candidate terminal 4 may constantly transmit the position information of its automobile to the base station 2, not only when, the user of the terminal explicitly shows the intention to provide information. In the following description, the case where the position information of the automobile is transmitted to the base station 2 when, the user explicitly shows the intention to provide information acquired by the information acquiring unit to another user, is used as an example.

The base station 2 not only has a transmitting/receiving unit for transmitting/receiving data to/from the respective mobile stations 4 to 6, but also has a user database 3 as a data storage unit for holding the position information transmitted from the information providing candidate terminal 4 for a predetermined period and for holding the position information of each terminal, the identification number of each terminal, and the accounting information of each terminal, which will be described later. When the position information is transmitted from the information providing candidate terminal 4, the base station 2 saves the position information into the user database 3 as the processing P1 shown in FIG. 2. The specific structure and operation of the base station 2 will be described later.

Moreover, the base station 2 stores the data returned from the information providing candidate terminal 4 into the database 3. Information about a plurality of routes on which the information providing candidate terminal 4 traveled in the past is also stored in the database 3.

On the other hand, the information requesting terminal 6 transmits information to the effect that the terminal requests for information related to the traveling direction of its automobile (hereinafter referred to as request information) to the base station 2 as the processing T2 shown in FIG. 2, when the user explicitly shows a request for acquiring the information related to the traveling direction of the automobile for example, an image of a position to be reached by the automobile in the future.

The request information transmitted by the information requesting terminal 6 to the base station 2 may include the following information. That is, the request information includes the identification number of the terminal (because of the need to acquire the history from the user database 3 at the base station 2, as will be described later), a signal indicating the request for information, the position information of its automobile, the form of requested information such as a dynamic image or a static image, the contents of requested information such as information indicating shops, traffic signals and the overall state, and if the user of the information requesting terminal designates information about a desired position, the position information thereof.

The information requesting terminal 6 may constantly request the base station 2 for the information related to the traveling direction of its automobile, not only when the user of the terminal explicitly shows the intention or request for acquiring the information. In the following description, the case where the request information is transmitted to the base station when the user explicitly shows the intention or request for acquiring the information related to the traveling direction of the automobile, will be used as an example. Image information is used as the information requested by the information requesting terminal 6, for example, as the information related to the traveling direction of its automobile.

When the request information is transmitted from the information requesting terminal 6, the base station 2 takes out the position information of the information requesting terminal 6 from the request information and predictively calculates the traveling route of the information requesting terminal 6 on the basis of the position information and the past input history information from the information requesting terminal 6, as the processing P2 shown in FIG. 2.

Next, the base station 2 determines whether or not an information providing candidate terminal exists on the traveling route of the information requesting terminal 6 on the basis of the traveling route of the information requesting terminal 6 and the position information of other information providing candidate terminals saved in the user database 3, as the processing P3 shown in FIG. 2. If an information providing candidate terminal exists on the traveling route, the base station 2 selects that information providing candidate terminal as an information providing terminal. In the example of FIG. 1, it is selected as the information providing terminal 5. Moreover, the base station 2 requests the information providing terminal 5 for acquisition of image information at a desired position on the traveling route that is predictively calculated and transmission of the acquired image information, as the processing T3 shown in FIG. 2.

On receiving the image information transmission request from the base station 2, the information providing terminal 5 acquires image information by using the information acquiring unit at the desired position on the traveling route, which is the position where the request is made, as the processing P4 shown in FIG. 2. Then, the, information providing terminal 5 returns the acquired image information to the base station 2 as the processing T4 shown in FIG. 2. In the case where image information is acquired at the information providing terminal 5 as in this embodiment, the information acquiring unit of the information providing terminal 5 has a video camera for shooting, for example, a forward image in front of the vehicle.

On receiving the image information returned from the information providing terminal 5, the base station 2 returns the image information to the information requesting terminal 6 as the processing T5 shown in FIG. 2.

Thus, the information requesting terminal 6 can acquire the image information provided by the information providing terminal 5 as the information related to the traveling direction of its automobile. As the processing P5 shown in FIG. 2, the information requesting terminal 6 enables presentation of the image, for example, display of the image on the display of the car navigation device.

After that, as the processing P6 shown in FIG. 2, the base station 2 sends the accounting information updated on receiving the provision of the image information from the information providing terminal 5 and the accounting information updated on providing the image information to the information requesting terminal 6, to the accounting management center 7 when necessary.

Thus, the accounting management center 7 collects the use fee corresponding to the contents and quantity of the provided information from the user of the information requesting terminal 6 through off-line or on line procedure. Specifically, the accounting management center 7 cuts down the amount information provided from the user of the information requesting terminal 6 and the amount information of the accounting information including account information.

The accounting management center 7 also pays the information provision fee to the user of the information providing terminal 5. For example, the accounting management center 7 updates the amount information of the user of the information providing terminal 5 and the amount information of the accounting information including account information.

It is also possible only to collect the use fee from the user of the information requesting terminal 6 and not to pay the information provision fee to the information providing terminal 5. It is also possible to send a certain advertisement to the information requesting terminal 6 together with the information provided from the information providing terminal 5 and not to collect the use fee, either.

Hereinafter, the structure and operation of the constituent elements of the data communication system according to the present invention will be described.

Figure 3:
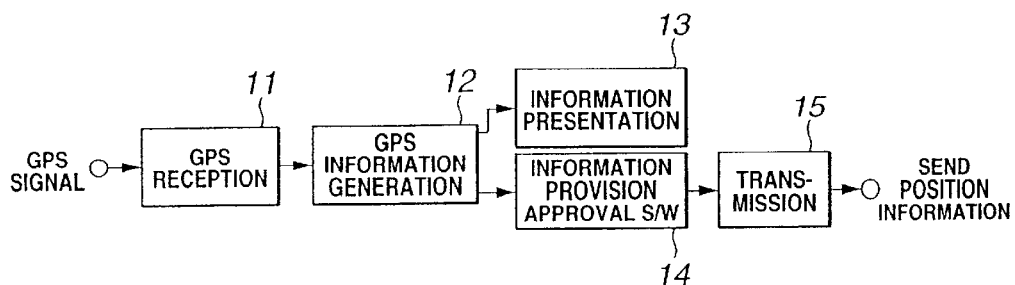
FIG. 3 is a view showing an exemplary structure of main parts of an information providing candidate terminal, which constitutes the data communication system according to the present invention.

FIG. 3 shows an exemplary structure of the information providing candidate terminal 4. FIG. 3 shows only the main constituent elements for a mobile station to operate as the information providing candidate terminal 4.

In FIG. 3, a signal obtained by receiving radio waves from each GPS satellite 1 (hereinafter referred to as GPS signal) is received by a GPS receiving unit 11, where decoding processing such as amplification and demodulation is carried out. The GPS signal outputted and decoded from the GPS receiving unit 11 is sent to a GPS information generating unit 12.

The GPS information generating unit 12 specifies the position indicated by the longitude, latitude and altitude of its automobile or its terminal carried out on the automobile and the time on the basis of time information and orbit information contained in the GPS signal, and sends the position information and time information as GPS information to an information presenting unit 13 and to an information provision approval S/W unit 14.

On the basis of the position information and time information from the GPS information generating unit 12, the information presenting unit 13 traces and displays the position of its automobile on a map displayed on a color display screen of, for example, a CRT or a liquid crystal display. The GPS receiving unit 11, the GPS information generating unit 12 and the information presenting unit 13 are similar to those carried on a typical car navigation device.

Meanwhile, the information provision approval S/W unit 14 has switch means as a user interface based on hardware or software. The information provision approval S/W unit 14 is operated by the user of the information providing candidate terminal 4 when the user explicitly shows to the base station 2 whether or not the user has the intention to provide information to another terminal, that is, the information requesting terminal 6. When the user has the intention to provide information to another terminal, a signal to that effect and at least the position information of the GPS information are outputted from the information provision approval S/W unit 14.

A transmitting unit 15 transmits the information supplied from the information provision approval S/W unit 14 to the base station 2.

The information provision approval S/W unit 14 can transmit only the position information from the GPS information generating unit 12 to the base station 2 via the transmitting unit 15, instead of generating the signal indicating that the user of the information providing candidate terminal 4 has the intention to provide information to another terminal. In this case, transmission of the position information itself explicitly shows the intention to provide information by the user of the information providing candidate terminal 4. The information transmitted to the base station 2 may include not only the position information but also the time information and the like contained in the GPS information.

Figure 4:
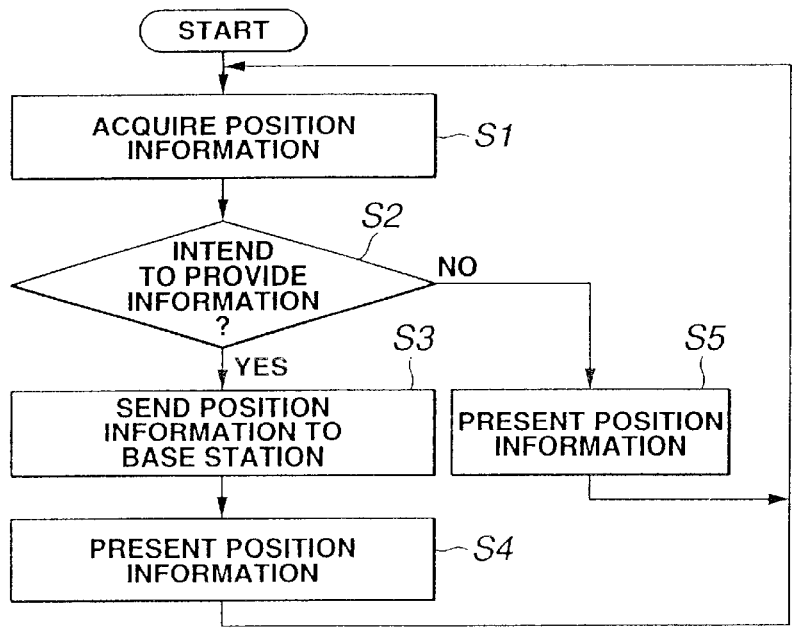
FIG. 4 is a flowchart showing the flow of principal processing, when a mobile station operates as an information providing candidate terminal.

FIG. 4 shows the flow of principal processing when a mobile station operates as the information providing candidate terminal 4.

In FIG. 4, as the processing of step S1, the GPS receiving unit 11 and the GPS information generating unit 12 of the information providing candidate terminal 4 receive radio waves from the GPS satellite 1 and acquire at least the position information of its automobile.

Next, at step S2, the information provision approval S/W unit 14 is operated in accordance with whether or not the user of the information providing candidate terminal 4 has the intention to provide information to another terminal. When the information provision approval S/W unit 14 is operated by the user of the information, providing candidate terminal 4, the processing goes to step S3. When the information provision approval S/W unit 14 is not operated, the processing goes to step S5.

If the user has the intention to provide information and the processing goes to step S3, at least the above-described position information is transmitted to the base station 2 from the transmitting unit 15. After this step S3, the processing goes to step S4.

At step S4, the information presenting unit 13 traces and displays the position of its automobile on a map showing the vicinity of the position of the automobile, for example, a guide map, displayed on a color display screen similarly to an ordinary car navigation device by using the GPS information from the GPS information generating unit 12.

On the other hand, if the user has no intention to provide information and the processing goes from step S2 to step S5, transmission of the information to the base station 2 from the transmitting unit 15 is not carried out and the information presenting unit 13 traces and displays the position of its automobile on a map showing the vicinity of the position of the automobile, for example, a guide map, displayed on a color display screen similarly to an ordinary car navigation device by using the GPS information from the GPS information generating unit 12.

Figure 5:
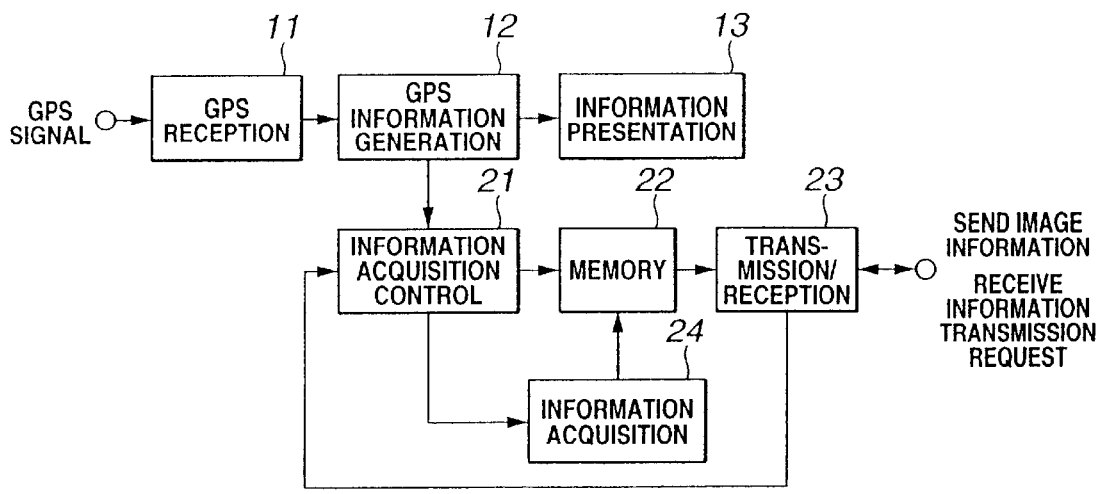
FIG. 5 is a view showing an exemplary structure of main parts of an information providing terminal, which constituted the data communication system according to the present invention.

FIG. 5 shows an exemplary structure of the information providing terminal 5. FIG. 5 shows only the main constituent elements for a mobile station to operate as the information providing terminal 5. Of the constituent elements shown in FIG. 5, constituent elements corresponding to those in FIG. 3 are denoted by the same numerals.

In FIG. 5, a signal obtained by receiving radio waves from each GPS satellite 1 is received by a GPS receiving unit 11, where decoding processing such as amplification and demodulation is carried out. The GPS signal outputted and decoded from the GPS receiving unit 11 is sent to a GPS information generating unit 12.

The GPS information generating unit 12 specifies the position indicated by the longitude, latitude and altitude of its automobile or its terminal carried out on the automobile and the time on the basis of time information and orbit information contained in the GPS signal, and sends the position information and time information as GPS information to an information presenting unit 13 and to an information acquisition control unit 21.

On the basis of the position information and time information from the GPS information generating unit 12, the information presenting unit 13 traces and displays the position of its automobile on a guide map showing the vicinity of the position of the automobile displayed, for example, on a color display screen. The GPS receiving unit 11, the GPS information generating unit 12 and the information presenting unit 13 are similar to those carried on a typical car navigation device.

A transmitting/receiving unit 23 transmits an information transmission request signal to the information acquisition control unit 21 when the information transmission request signal is transmitted from the base station 2.

Meanwhile, when the position indicated by the GPS information from the GPS information generating unit 12 is the position requested by the information transmission request signal, the information acquisition control unit 21 controls an information acquiring unit 24 to acquire information, that is, image information in this example, at that position, and also controls a memory 22 to store the information acquired by the information acquiring unit 24.

After that, the information acquisition control unit 21 reads out and sends the information stored in the memory 22, for example, image information, to the transmitting/receiving unit 23. When an information retransmission request is sent from the base station 2, the information acquisition control unit 21 controls the memory 22 to read out past information which is already stored therein and to send it to the transmitting/receiving unit 23.

The transmitting/receiving unit 23 transmits the information read out from the memory 22 under the control of the information acquisition control unit 21, for example, image information, to the base station 2.

It is also possible to constantly store in and read out from the memory 22 the information acquired by the information acquiring unit 24, for example, image information, correspondingly to the position information from the GPS information generating unit 12, and send the image information and the corresponding position information to the base station 2 when an information transmission request signal is sent from the base station 2, not only when the position indicated by the GPS information from the GPS information generating unit 12 is the position requested by the information transmission request signal.

Figure 6:
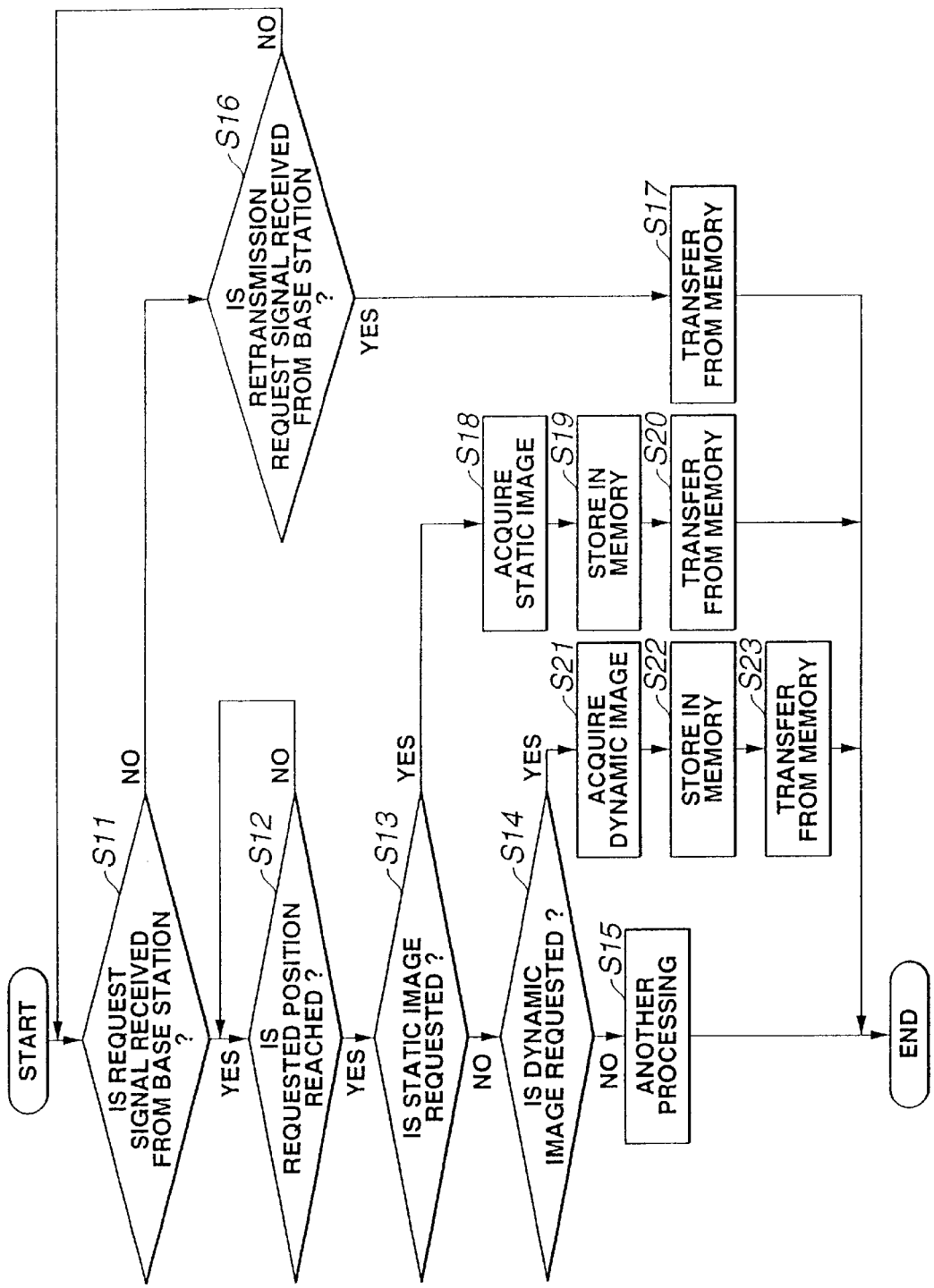
FIG. 6 is a flowchart showing the flow of principal processing when a mobile station operates as an information providing terminal.

FIG. 6 shows the flow of principal processing when a mobile station operates as the information providing terminal 5.

In FIG. 6, if the information acquisition control unit 21 detects, as the processing of step S11, that the transmitting/receiving unit 23 received an information transmission request signal from the base station 2, the processing goes to step S12. If no information transmission request signal is detected, the processing goes to step S16.

At step S12, the information acquisition control unit 21 waits until the position of its automobile indicated by the GPS information from the GPS information generating unit 12 becomes the position requested by the information transmission request signal. When the requested position is reached, the processing goes to step S13. More specifically, the information acquisition control unit 21 compares the position information contained in the information transmission request signal with the position information temporarily stored in a memory provided inside the information acquisition control unit 21. Thus, the information acquisition control unit 21 can detect the coincidence of the position information and can determine that the requested position is reached.

At step S13, the information acquisition control unit 21 determines whether the in information requested by the information transmission request signal is a static image or not. If the requested information is a static image, the processing goes to Step S18. If the requested information is not a static image, the processing goes to step S14.

At step S14, the information acquisition control unit 21 determines whether the information requested by the information transmission request signal is a dynamic image or not. If the requested information is a dynamic image, the processing goes to step S21. If the requested information is not a dynamic image, the processing goes to step S15.

If it is determined at step S14 that a dynamic image is not requested and the processing goes to step S15, the information providing terminal 5 shifts to another processing.

On the other hand, if it is determined at step S14 that a dynamic image is requested and the processing goes to step S21, the information acquisition control unit 21 controls the information acquiring unit 24 to acquire dynamic image information. At step S22, the information acquisition control unit 21 controls the memory 22 to store the dynamic image information. Then, at step S23, the information acquisition control unit 21 controls the memory 22 to read out and send the stored dynamic image information to the transmitting/receiving unit 23. Thus, the dynamic image information is returned from the transmitting/receiving unit 23 to the base station 2.

Meanwhile, if it is determined at step S13 that a static image is requested and the processing goes to step S18, the information acquisition control unit 21 controls the information acquiring unit 24 to acquire static image information. At step S19, the information acquisition control unit 21 controls the memory 22 to store, the static image information. Then, at step S20, the information acquisition control unit 21 controls the memory 22 to read out and send the stored static image information to the transmitting/receiving unit 23. Thus, the static image information is returned from the transmitting/receiving unit 23 to the base station 2.

If it is determined at step S11 that an information transmission request signal is not sent from the base station and the processing goes to step S16, the information acquisition control unit 21 determines whether or not the transmitting/receiving unit 23 received an information retransmission request signal from the base station 2. If an information retransmission request signal is not received, the processing returns to step S11. If an information retransmission request signal is received, the processing goes to step S17.

If the information retransmission request signal is received and the processing goes to step S17, the information acquisition control unit 21 controls the memory 22 to read out image information corresponding to the information retransmission request signal, from the past image information which is already stored therein, and to send the image information to the transmitting/receiving unit 23. Thus, the image information stored in the past is returned from the transmitting/receiving unit 23 to the base station 2.

Figure 7:
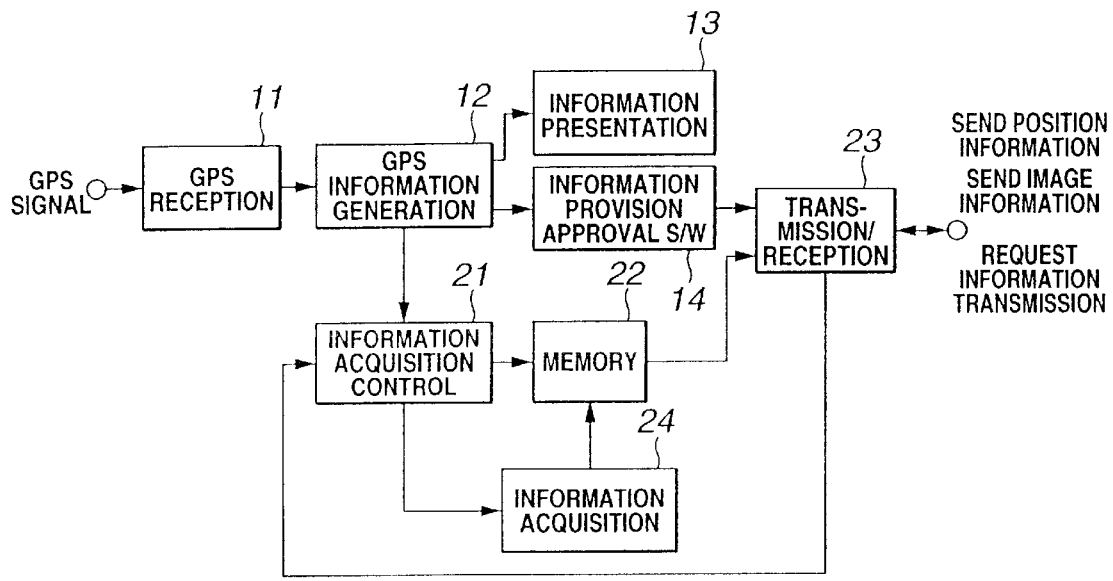
FIG. 7 is a view showing an exemplary structure of main parts of a terminal having both functions of an information providing candidate terminal and an information providing terminal.

While FIGS. 3 and 5 show only the structures of the main parts of the information providing candidate terminal and the information providing terminal, respectively the information providing candidate terminal and the information providing terminal need to have at least the functions of both terminals, as shown in FIG. 7. Of the constituent elements shown in FIG. 7, the constituent elements corresponding to those in FIGS. 3 and 5 are denoted by the same numerals.

In FIG. 7, GPS information generated by a GPS receiving unit 11 and a GPS information generating unit 12 is sent to an information presenting unit 13, an information provision approval S/W unit 14 and an information acquisition control unit 21.

More specifically, the GPS information generating unit 12 specifies the position of its automobile and the time on the basis of time information and orbit information contained in the GPS signal, and sends the position information and the time information as GPS information to the information presenting unit 13 and further to the information provision approval S/W unit 14 and the information acquisition control unit 21.

The information presenting unit 13 traces and displays the position of the automobile on a guide map showing the vicinity of the position of the automobile on the basis of the position information and the time information from the GPS information generating unit 12, similarly to an ordinary car navigation device.

The information provision approval S/W unit 14 is operated by the user of the corresponding terminal when the user explicitly shows to the base station 2 whether or not the user has the intention to provide information to another terminal, that is, the information requesting terminal 6. When, the user has the intention to provide information to another terminal, a signal to that effect and at least the position information of the GPS information are outputted from the information provision approval S/W unit 14.

A transmitting/receiving unit 23 transmits the information supplied from the information provision approval S/W unit 14 to the base station 2. The transmitting/receiving unit 23 also transmits an information transmission request signal to the information acquisition control unit 21 when the information transmission request signal is transmitted from the base station 2.

Meanwhile, when the position indicated by the GPS information from the GPS information generating unit 12 is the position requested by the information transmission request signal, the information acquisition control unit 21 controls an information acquiring unit 24 to acquire image information at that position, and also controls a memory 22 to store the information acquired by the information acquiring unit 24.

After that, the information acquisition control unit 21 reads out and sends the image information stored in the memory 22 to the transmitting/receiving unit 23. When an information retransmission request is sent from the base station 2, the information acquisition control unit 21 controls the memory 22 to read out past information which is already stored therein and to send it to the transmitting/receiving unit 23.

Thus, the transmitting/receiving unit 23 transmits the information read out from the memory 22 under the control of the information acquisition control unit 21, for example, image information, to the base station 2.

Figure 8:
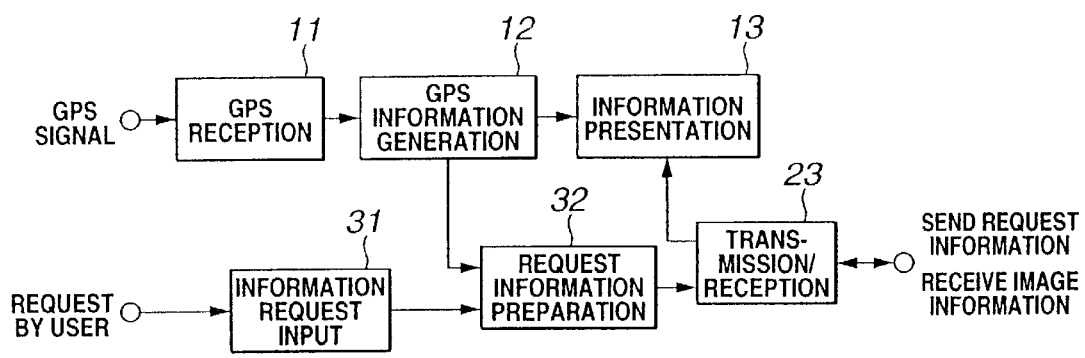
FIG. 8 is a view showing an exemplary structure of main parts of an information requesting terminal.

FIG. 8 shows an exemplary structure of the information requesting terminal 6. FIG. 8 shows only the main constituent elements for a mobile station to operate as the information requesting terminal 6. Of the constituent elements shown in FIG. 6, constituent elements corresponding to those in FIG. 3 are denoted by the same numerals.

In FIG. 8, a GPS signal obtained by receiving radio waves from each GPS satellite 1 is received by a GPS receiving unit 11, where amplification, demodulation processing and the like are carried out. The GPS signal outputted from the GPS receiving unit 11 is sent to a GPS information generating unit 12.

The GPS information generating unit 12 specifies the position of its automobile and the time on the basis of time information and orbit information contained in the GPS signal, and sends the position and traveling route information as GPS information to an information presenting unit 13 and sends at least the position information to a request information preparing unit 32.

On the basis of the position and traveling route information and the time information from the GPS information generating unit 12, the information presenting unit 13 traces and displays the position of its automobile on a guide map showing the vicinity of the position of the automobile, similarly to a typical car navigation device.

An information request input unit 31 has input means as a user interface based on, for example, hardware or software. The information request input unit 31 is operated by the user of the information requesting terminal 6 when the user explicitly shows to the base station 2 whether or not the user has the intention to request image information such as a static image or a dynamic image of a desired position in the traveling direction of the user's automobile. When the user has the intention to request information from the base station 2, a signal to that effect is outputted and sent from the information request input unit 31 to the request information preparing unit 32.

The request information preparing unit 32 generates request information containing the identification number of its terminal which is registered in advance, the signal supplied from the information request input unit 31 indicating that the user of the information requesting terminal 6 is requesting information, the position information of the automobile supplied from the GPS information generating unit 12, the form of the requested information such as a dynamic image or a static image, the contents of the requested information such as information showing shops, traffic signals and overall conditions, and the position information of a place desired by the user of the terminal, if it is designated. The request information-preparing unit 32 encodes this request information and sends it to a transmitting/receiving unit 23.

Thus, the encoded request information is transmitted, from the transmitting/receiving unit 23 to the base station 2.

When image information provided from the information providing terminal via the base station 2 is returned in response to the request information, the transmitting/receiving unit 23 sends the image information to the information presenting unit 13. If the information is coded or encrypted, the information is presented by the information presenting unit 13 after suitably decoding the information. Thus, the information presenting unit 13 displays the image provided from the information providing terminal via the base station 2, together with a guide map showing the vicinity of the position of the automobile and the traced position of the automobile. In this case, a static image is displayed when a static image is provided in response to the request, and a dynamic image is displayed when a dynamic image is provided.

Figure 9:
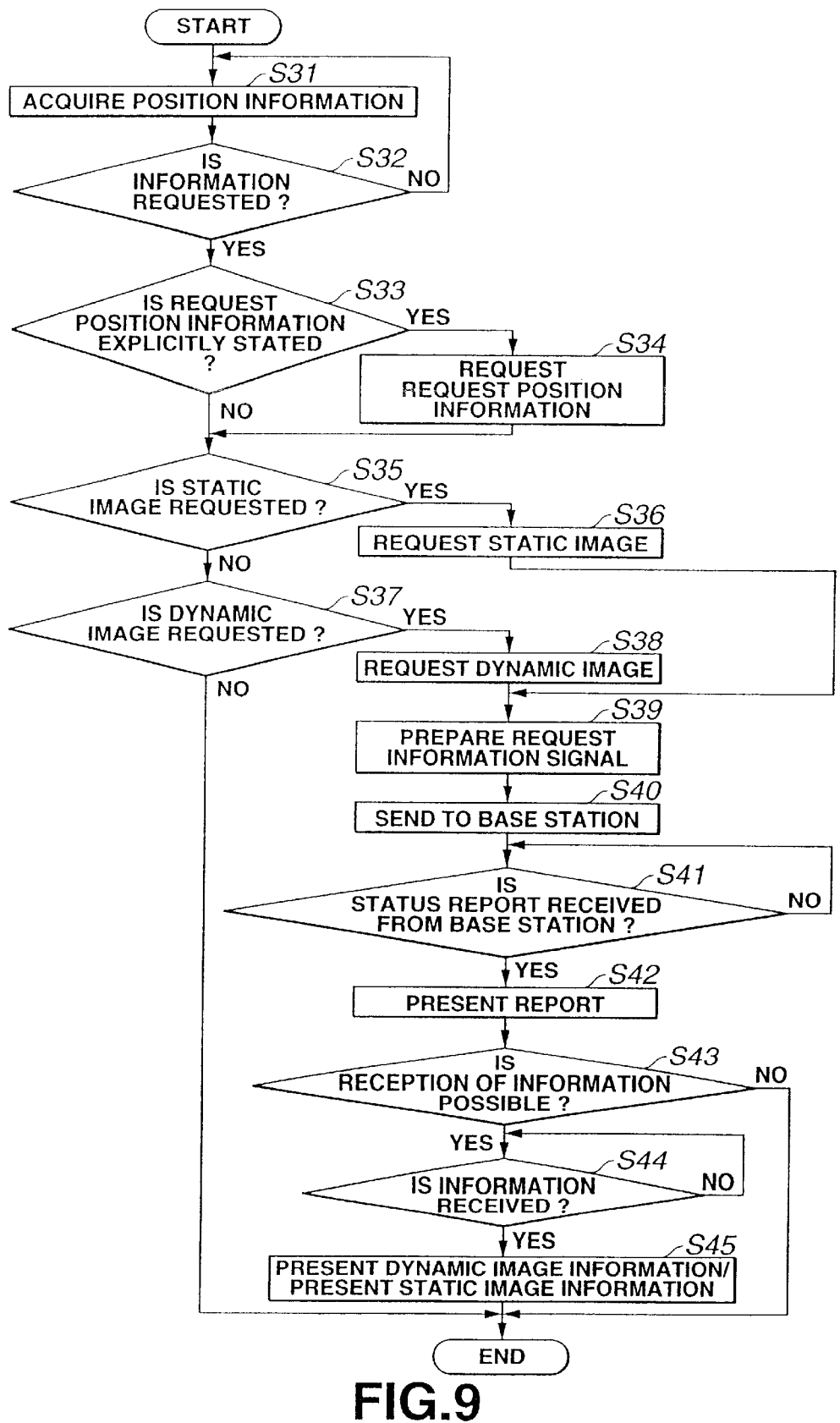
FIG. 9 is a flowchart showing the flow of principal processing when a mobile station operates as an information requesting terminal.

FIG. 9 shows the flow of principal processing when a mobile station operates as the information requesting terminal 6.

In FIG. 9, at step S31, the GPS receiving unit 11 and the GPS information generating unit 12 of the information requesting terminal 6 receive radio waves from the GPS satellite 1 and acquire at least information about the position and the traveling direction of its automobile. The position and the traveling direction information are sent to the information presenting unit 13 and the position information is sent to the request information preparing unit 32.

As the processing of step S32, the request information preparing unit 32 determines whether or not an input for requesting information is made by the user of the information requesting terminal 6 via the information request input unit 31. If the input for requesting information is not made by the user, the processing returns to step S31. If the input is made, the processing goes to step S33.

At step S33, the request information preparing unit 32 determines whether or not the user of the information requesting terminal 6 explicitly states a desired position for the information request (information request position) via the information request input unit 31. If the information request position is not explicitly stated, the processing goes to step S35. If the information request position is explicitly stated, the processing goes to step S34. At step S34, the request information preparing unit 32 prepares the requested position information as information contained in the request information and then goes to step S35.

At step S35, the request information preparing unit 32 determines whether or not a static image is requested as the formed of information by the user of the information requesting terminal 6 via the information request input unit 31. If a static image is not requested, the processing goes to step S37. If a static image is requested, the request information preparing unit 32 at step S36 prepares information indicating the a static image is requested, as information contained in the request information, and then goes to step S39.

At step S37, the request information preparing unit 32 determines whether or not a dynamic image is requested as the form of information by the user of the information requesting terminal 6 via the information request input unit 31. If a dynamic image is not requested, that is, if no request is made at steps S33, S35 and S37, the processing ends. If a dynamic image is requested, the request information preparing unit 32 prepares information indicating that a dynamic image is requested, as information contained in the request information, and then goes to step S39.

At step S39, the request information preparing unit 32 generates request information containing the position information if the information request position is explicitly stated at step S34, the information showing the form of information requested by the user which is prepared at step S36 or S38, the identification number, the signal indicating that the user of the information requesting terminal 6 is requesting information which is explicitly stated at step S32, the position information of the automobile acquired at step S31, and the contents of the requested information such as information showing shops, traffic signals and overall conditions. This request information is coded and sent to the transmitting/receiving unit 23.

The transmitting/receiving unit 23 transmits the request information to the base station 2, as the processing of step S40.

At step S41, the transmitting/receiving unit 23 waits for reception of a status report from the base station 2, which will be described later. When the transmitting/receiving unit 23 has received the status report, the transmitting/receiving unit 23 sends the received signal of the status report to the information presenting unit 13, as the processing of step S42. Thus, the status at the present time point or the like is displayed on the display screen of the information presenting unit 13.

At step S43, the transmitting/receiving unit 23 determines whether or not it can receive the information from the base station 2 corresponding to the request. If it cannot receive the information, the processing ends. If it can receive the information, the transmitting/receiving unit 23 waits for reception of information at step S44. When the transmitting/receiving unit 23 has received the information, the transmitting/receiving unit 23 sends the received information to the information presenting unit 13. Thus, information of a dynamic image or a static image sent from the base station 2 in response to the request is displayed on the display screen of the information presenting unit 13.

Figure 10:
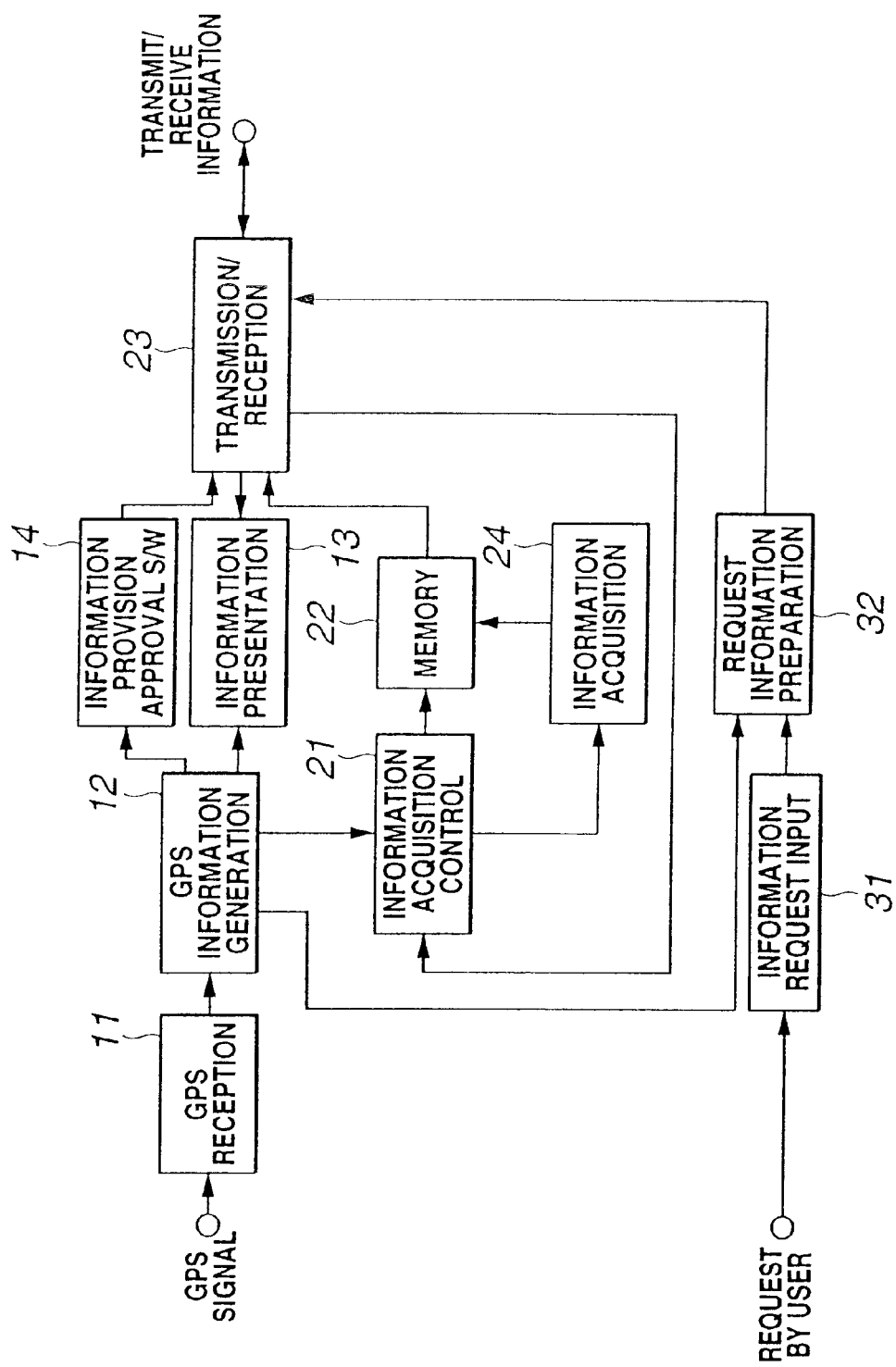
FIG. 10 is a view showing an exemplary structure of main parts of a terminal having the functions of an information providing candidate terminal, an information providing terminal and an information requesting terminal.

FIG. 10 shows the structure of main parts of a terminal having the functions of the above described information providing candidate terminal, the information providing terminal and the information requesting terminal. Of the constituent elements shown in FIG. 10, constituent elements corresponding to those in FIGS. 3, 5, 7 and 8 are denoted by the same numerals.

In FIG. 10, GPS information generated by a GPS receiving unit 11 and a GPS information generating unit 12 is sent to an information presenting unit 13, an information provision approval S/W unit 14, an information acquisition control unit 21 and a request information preparing unit 32. The GPS information generating unit 12 specifies the position of its automobile and the time on the basis of time information and orbit information contained in the GPS signal, and sends the position information and the time information as GPS information to the information presenting unit 13 and also to the information provision approval S/W unit 14, the information acquisition control unit 21 and the request information preparing unit 32.

The information presenting unit 13 traces and displays the position of its automobile on a guide map showing the vicinity of the position of the automobile on the basis o the position information and the time information from the GPS information generating unit 12, similarly to an ordinary car navigation device.

The information provision approval S/W unit 14 is operated by the user of the corresponding terminal when the user explicitly shows to the base station 2 whether or not the user has the intention to provide information to the information requesting terminal 6, which is another terminal. The information provision approval S/W unit 14 is operated by the user, and a signal to that effect and at least the position information of the GPS information are outputted and sent to a transmitting/receiving unit 23.

An information request input unit 31 is operated by the user of the corresponding terminal when the user explicitly shows to the base station 2 whether the user has the intention to request, for example, image information about a desired position in the traveling direction of the user's automobile. The information request input unit 31 is operated when the user has the intention to request information from the base station 2, and a signal to that effect is outputted and sent from the information request input unit 31 to the request information preparing unit 32.

The request information preparing unit 32 generates the request information on the basis of the position information of the automobile supplied from the GPS information generating unit 12 and the signal indicating that the user of the terminal is requesting information which is supplied from the information request input unit 31. The request information preparing unit 32 then encodes the request information and sends the encoded request information to the transmitting/receiving unit 23.

The transmitting/receiving unit 23 transmits the request information to the base station 2 when the request information is supplied from the request information preparing unit 32. When information is supplied from the information provision approval S/W unit 14, the transmitting/receiving unit 23 transmits that information to the base station 2.

When an information transmission request signal is transmitted from the base station 2, the transmitting/receiving unit 23 sends the information transmission request signal to the information acquisition control unit 21.

When the position indicated by the GPS information from the GPS information generating unit 12 is the position requested by the information transmission request signal from the base station 2, the information acquisition control unit 21 control an information acquiring unit 24 to acquire image information at that position and also controls a memory 22 to store the information acquired by the information acquiring unit 24.

After that the information acquisition control unit 21 causes the memory 22 to read out the image information stored therein and to send the image information, to the transmitting/receiving unit 23. For example, when an information retransmission request is transmitted from the base station 2, the information acquisition control unit 21 controls the memory 22 to read out past information which is already stored therein and to send it to the transmitting/receiving unit 23. Thus, the information (image information) read out from the memory 22 under the control of the information acquisition control unit 21 is transmitted from the transmitting/receiving unit 23 to the base station 2.

Meanwhile, when image information provided from the information providing terminal via the base station 2 is returned in response to the request information, the transmitting/receiving unit 23 sends the image information to the information presenting unit 13.

Thus, the information presenting unit 13 displays the image provided from the information providing terminal via the base station 2, together with a guide map showing the vicinity of the position of the automobile and the traced position of the automobile. In this case, a static image is displayed when a static image is provided in response to the request, and a dynamic image is displayed when a dynamic image is provided.

Figure 11:
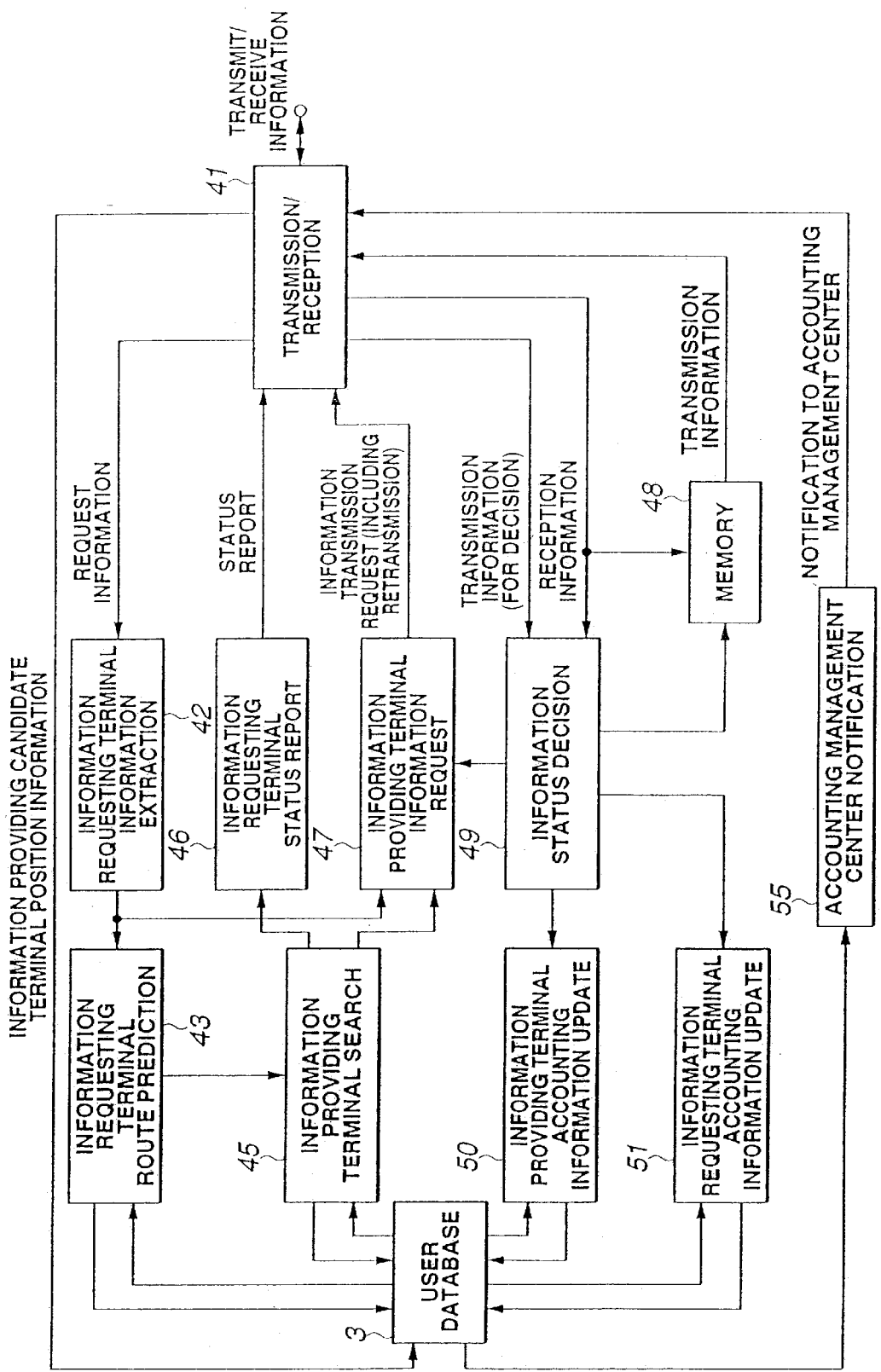
FIG. 11 is a view showing an exemplary structure of main parts of a base station.

FIG. 11 shows an exemplary structure of the base station 2. FIG. 11 shows only the main constituent elements for the base station 2 to transmit and receive various information to and from each of the above-described terminals.

In FIG. 11, when the user of the information providing candidate terminal 4 has the intention to provide information and the position information of the information providing candidate terminal 4, is transmitted to the base station 2, a transmitting/receiving unit 41 receives the position information of the information providing candidate terminal 4 and sends it to a user database 3. The user database 3 holds the position information from the information providing candidate terminal 4 for a predetermined time period.

When request information is transmitted from the information requesting terminal 6, the transmitting/receiving unit 41 sends the request information to an information extracting unit 42. The information extracting unit 42 decodes the request information, and extracts the identification number of the information requesting terminal, a signal indicating that information is requested, the position information of the information requesting terminal, the form of requested information, the contents of requested information, and the position information of a place desired by the user of the information requesting terminal if it is designated by the user, which are contained in the request information. The transmitting/receiving unit 41 then sends the extracted information to a route predicting unit 43.

If the user of the information requesting terminal does not explicitly state the position where the user wants information, the route predicting unit 43 determines, whether or not the terminal is a normal terminal authorized to receive the service of this system. If it is determined that the terminal is a normal terminal, the route predicting unit 43 acquires the history of the past position information of the terminal which is already stored in the user database 3, and predicts the route which is considered to be taken from now on by the information requesting terminal on the basis of the history of the past position information. The route predicting unit 43 sends the information of the predicted route to a providing terminal search unit 45.

On the other hand, if the user of the information requesting terminal explicitly states the position where the user wants information, the route predicting unit 43 only determines whether or not the terminal is a normal terminal of a normal user, from the identification number of the information requesting terminal. If it is determined that the terminal is a normal terminal, the route predicting unit 43 sends the desired position information sent from the information requesting terminal to the providing terminal search unit 45.

The providing terminal search unit 45 determines whether or not an information providing candidate terminal exists on the predicted route of the information requesting terminal or at the position desired by the user of the information requesting terminal, by using the position information of each information providing candidate terminal stored in the user database 3. The providing terminal search unit 45 may also determine whether or not an information providing candidate terminal reaches the position.

If an information providing candidate terminal exists on the predicted route of the information requesting terminal or at the position desired by the user of the information requesting terminal, the providing terminal search unit 45 designates that information providing candidate terminal as the information providing terminal and sends information to that effect to a providing terminal information requesting unit 47 and a requesting terminal status report unit 46.

The providing terminal information requesting unit 47 in this case is also supplied with the request information extracted by the information extracting unit 42. The providing terminal information requesting unit 47 generates an information transmission request signal for requesting the designated information providing terminal to acquire information corresponding to the request information and to send it to the base station 2, and sends the information transmission request signal to the transmitting/receiving unit 41. Thus, the information transmission request signal is transmitted from the transmitting/receiving unit 41 to the information providing terminal.

If an information providing candidate terminal does not exist on the predicted route of the information requesting terminal or at the position desired by the user of the information requesting terminal, the providing terminal search unit 45 sends information to that effect to the requesting terminal status report unit 46. The providing terminal search unit 45 may also determine whether or not an information providing candidate terminal reaches the position, and if it is determined that an information providing candidate terminal reaches the position, the providing terminal search unit 45 may sends information to that effect to the requesting terminal status report unit 46.

The requesting terminal status report unit 46 generates a status report signal indicating that an information providing candidate terminal exists on the predicted route or the desired position and therefore is designated as the information providing, terminal, or that an information providing candidate terminal does not exist, or that an information providing candidate terminal reaches the position, and sends the status report signal to the transmitting/receiving unit 41. The status report signal is transmitted to the information requesting terminal from the transmitting/receiving unit 41, and the information requesting terminal can thus learn the present status.

An information status deciding unit 49 of the base station decides whether or not the transmitting/receiving unit 41 could correctly receive the information such as image information returned from the information providing terminal when the information providing terminal exists.

If it is determined that the transmitting/receiving unit 41 could correctly receive the information such as image information returned from the information providing terminal, the information status deciding unit 49 controls a memory 48 to store the returned information and also to read out and send the information stored in the memory 48 to the transmitting/receiving unit 41. Thus, the information such as an image transmitted from the information providing terminal is transmitted from the transmitting/receiving unit 41 to the information requesting terminal.

On the other hand, if it is determined that the transmitting/receiving unit 41 could not correctly receive the information returned from the information providing terminal, the information status deciding unit 49 controls the providing terminal information requesting unit 47 to generate an information retransmission request signal for requesting the designated information providing terminal to retransmit the information, and, to send the information retransmission signal to the transmitting/receiving unit 41. Thus, the information retransmission request signal is transmitted from the transmitting/receiving unit 41 to the information providing terminal. In the case where the information retransmission request is made, the transmitting/receiving unit 41 waits until the information is retransmitted from the information providing terminal.

The information status deciding unit 49 also decides whether or not the information is correctly transmitted from the transmitting/receiving unit 41.

If the information is not correctly transmitted to the information requesting terminal, the information status deciding unit 49 causes the memory 48 to read out again the information from the information providing terminal stored in the memory 48 and to send it to the transmitting/receiving unit 41, thus causing the transmitting/receiving unit 41 to retransmit the information to the information requesting terminal.

The decision, by the information status deciding unit 49 is about whether, information is correctly transmitted or received, by using a technique of comparing the size of the transmitted or received information.

When the information is correctly transmitted or received the information status deciding unit 49 sends information to that effect to accounting information updating units 50, 51 which carry out management such as update of accounting information of the information providing terminal and the information requesting terminal used for transmission and reception of information.

The providing terminal accounting information updating unit 50 updates the accounting information in the user database indicating that predetermined information provision fee is to be paid to the information providing terminal in the case where the information is correctly received from the information providing terminal.

For example, the providing terminal accounting information updating unit 50 updates the accounting information including the identifier, amount information and account number of the information requesting terminal, and the accounting information including the identifier, amount information and account number corresponding to the information providing terminal.

The requesting terminal accounting information updating unit 51 updates the accounting information in the user database indicating that predetermined information fee is to be collected from the information requesting terminal in the case where the information is correctly transmitted to the information requesting terminal.

For example, the requesting terminal accounting information updating unit 51 carries out update to increase the amount information of the accounting information including the amount information and account information corresponding to the information providing terminal.

The accounting information is held in the user database 3.

The accounting information held in the user database 3 is read out by an accounting management center notifying unit 55 and is sent to an accounting management center 7 via the transmitting/receiving unit 41.

In the above description, all the position information and accounting information are held in the user database 3. However, it is also possible to provide separate databases for holding the respective information.

Figure 12:
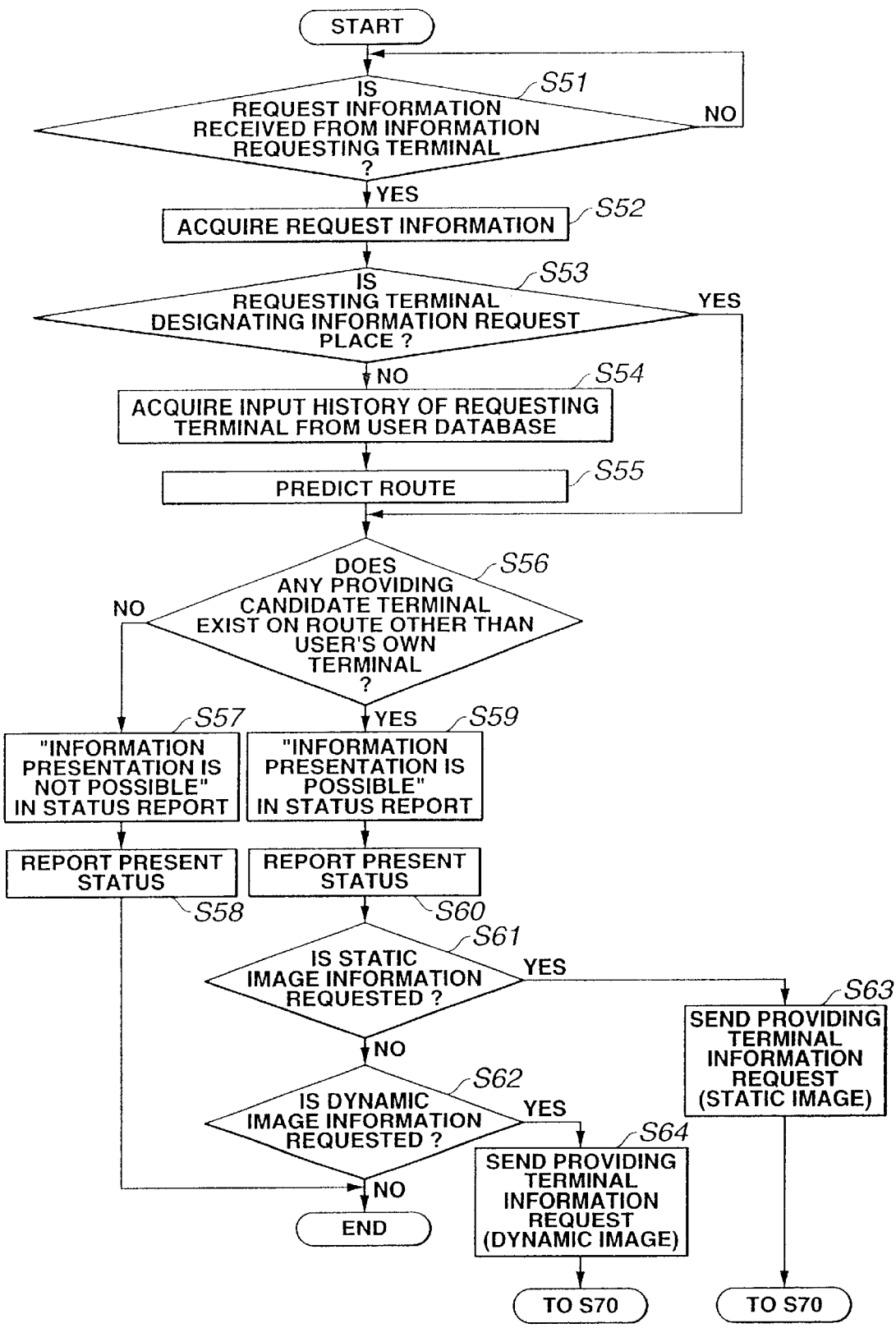
FIG. 12 is a flowchart showing the former half of the flow of principal processing at the base station.
Figure 13:
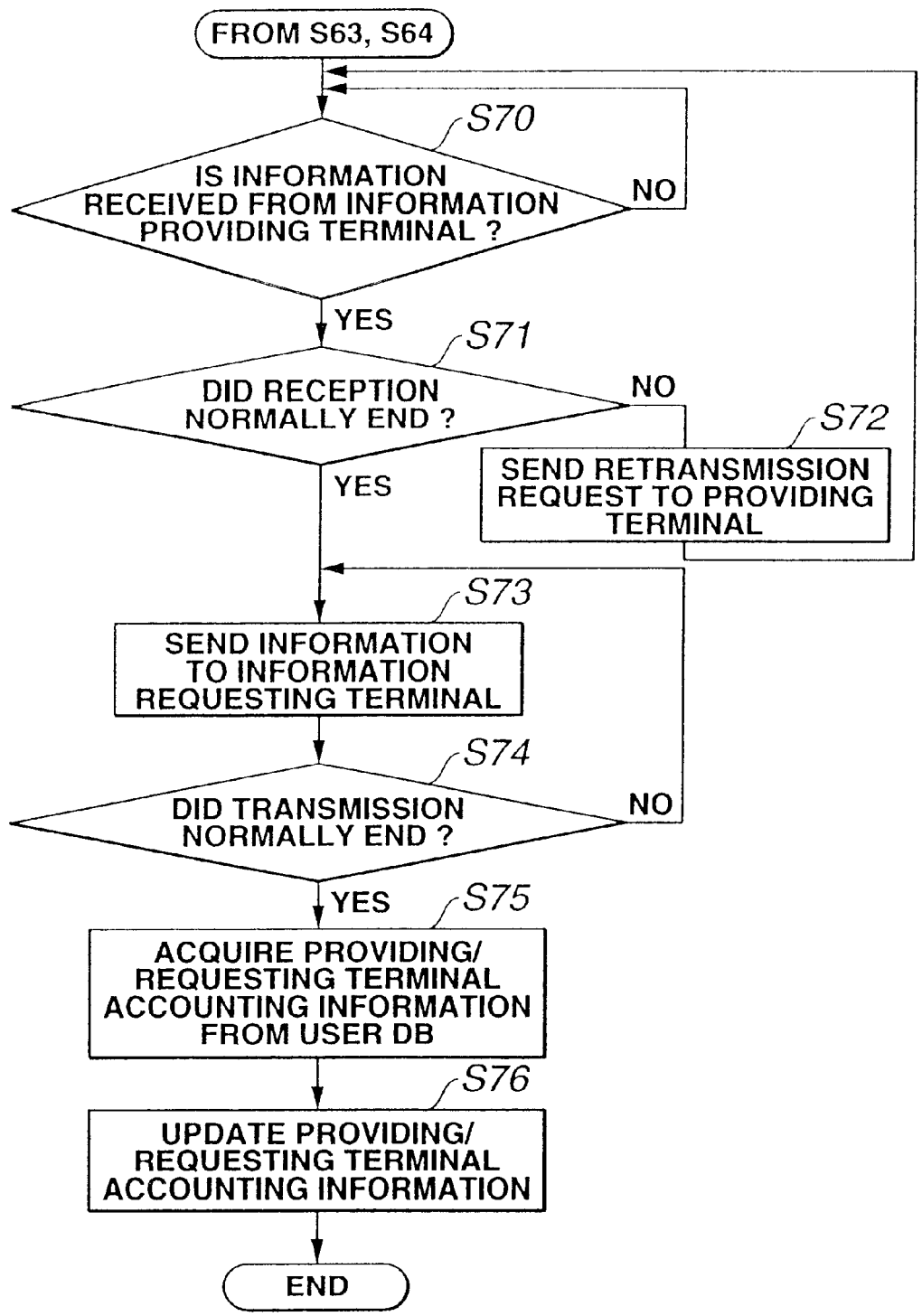
FIG. 13 is a flowchart showing the latter half of the flow of principal processing at the base station.

FIGS. 12 and 13 show the flow of the above-described series of principal operations at the base station 2.

In FIG. 12, at step S51, the information extracting unit 42 monitors whether or not the request information is received from the information requesting terminal by using the transmitting/receiving unit 41. When the request information is received, the processing goes to step S52.

At step S52, the information extracting unit 42 decodes the received request information, then extracts the identification number of the information requesting terminal, a signal indicating that information is requested, the position information of the information requesting terminal, the form of requested information, the contents of requested information, and the position information if the user of the information requesting terminal designates a desired position, from the request information, and sends the extracted information to the route predicting unit 43.

The route predicting unit 43, first at step S53, determines whether or not the information requesting terminal is a normal user or a normal terminal and whether or not the user of the information requesting terminal explicitly states a desired position. If the information requesting terminal is a normal terminal and the user does not explicitly state a desired position, the processing goes to step S54. If the information requesting terminal is a normal terminal and the user explicitly states a desired position, the processing goes to step S56.

At step S54, as a result of determination at step S53 that the information requesting terminal is a normal terminal and the user does not explicitly state a desired position, the route predicting unit 43 acquires the history of the past position information of the terminal which is already stored in the user database 3 and the processing goes to the next step S55.

At step S55, the route predicting unit 43 predicts the route of the information requesting terminal on the basis of the history of the past position information. The route predicting unit 43 predicts the traveling route on the basis of the history of the route information corresponding to the information requesting terminal 6 stored in the user database 3. For example, it is assumed that all the route information that was searched for by the route search function of the car navigation device loaded on the information requesting terminal 6 is stored in the user database 3.

The route predicting unit 43 extracts route information which overlaps the present position information, from the route information corresponding to the information requesting terminal 6 that was searched for in the past, and predicts the route of the information; requesting terminal along the extracted route information. The route predicting unit 43 sends the information of the predicted route to the information terminal search unit 45.

On the other hand, if it is determined at step S53 that the information requesting terminal is a normal terminal and the user explicitly states a desired position, or if the processing goes to step S56 after the processing of step S55, the providing terminal search unit 45 determines whether or not an information providing candidate terminal exists on the predicted route of the information requesting terminal or at the position desired by the user of the information requesting terminal, by using the position information of each information providing candidate terminal stored in the user database 3. If it is determined at step S56 that an information providing candidate terminal exists, the providing terminal search unit 45 sends a signal to that effect to the requesting terminal status report unit 46 and the processing goes to step S59. If it is determined that an information providing candidate terminal does not exist, the providing terminal search unit 45 sends a signal to that effect to the requesting terminal status report unit 46 and the processing goes to step S57.

At step S59, the requesting terminal status report unit 46 generates a status report signal indicating that the information can be provided to the information requesting terminal, and at step S60, causes the transmitting/receiving unit 41 to transmit the status report signal.

After that, at step S61, the providing terminal information requesting unit 47 determines whether the information requested by the request information is static image information or not. If it is determined at step S61 that the requested information is static image information, the processing goes to step S63. If it is determined that the requested information is not static image information, the processing goes to step S62.

At step S63, as a result of determination at step S61 that the requested information is static image information, the providing terminal information requesting unit 47 generates an information transmission request signal for requesting the designated information providing terminal to acquire and return static image information to the base station 2, and sends the information transmission request signal to the transmitting/receiving unit 41. Thus, the information transmission request signal for requesting the information providing terminal to send static image information is transmitted from the transmitting/receiving unit 41. After step S63, the processing goes to step S70 shown in FIG. 13.

On the other hand, at step S62, as a result of determination at step S61 that the requested information is not static image information, the providing terminal information requesting unit 47 determines whether the information requested by the request information is dynamic image information or not. If it is determined at step S62 that the requested information is dynamic image information, the processing goes to step S64. If it is determined that the requested information is not dynamic image information, the processing ends.

At step S64, as a result of determination at step S62 that the requested information is dynamic image information, the providing terminal information requesting unit 47 generates an information transmission request signal for requesting the designated information providing terminal to acquire and return dynamic image information to the base station 2, and sends the information transmission request signal to the transmitting/receiving unit 41. Thus, the information transmission request signal for requesting the information providing terminal to send dynamic image information is transmitted from the transmitting/receiving unit 41. After step S64, the processing goes to step S70 shown in FIG. 13.

Meanwhile, at step S57, as a result of determination at step S56 that an information providing candidate terminal does not exist, the requesting terminal status report unit 46 generates a status report signal indicating that the information cannot be provided to the information requesting terminal. After the transmitting/receiving unit 41 transmits the status report signal at step S58, the processing ends.

At step S70 shown in FIG. 13 after the processing of step S63 or S64 shown in FIG. 12, the information status deciding unit 49 monitors whether or not the transmitting/receiving unit 41 received the information returned from the information providing terminal. If it is determined that the transmitting/receiving unit 41 received the information, the processing goes to step S71 and the information status deciding unit 49 decides whether the reception normally ended or not.

If it is determined at step S71 that the reception did not normally end, the information status deciding unit 49 controls the providing terminal information requesting unit 47 to generate an information retransmission request signal for requesting the information providing terminal to retransmit the information, and causes the transmitting/receiving unit 41 to send the information retransmission request signal. After that, the processing returns to step S70.

On the other hand, if it is determined at step S71 that the reception normally ended, the processing goes to step S73 and the information status deciding unit 49 controls the memory 48 to store the received information and to read out and send the information stored in the memory 48 to the transmitting/receiving unit 41, thus causing the transmitting/receiving unit 41 to transmit the information transmitted from the information providing terminal to the information requesting terminal.

After that, at step S74, the information status deciding unit 49 decides whether the transmission of information normally ended or not.

If it is determined at step S74 that the transmission did not normally end, the processing returns to step S73. The information status deciding unit 49 controls the memory 48 to read out and send the stored information to the transmitting/receiving unit 41 and causes the transmitting/receiving unit 41 to retransmit the information.

If it is determined at step S74 that the transmission normally ended, the information status deciding unit 49 sends a signal to that effect to the accounting information updating units 50, 51. In this case, the accounting information updating units 50, 51 acquire the accounting information of the information providing terminal and the information requesting terminal from the user database 3. Moreover, at step S76, the accounting information updating units 50, 51 update the accounting information so as to pay predetermined information provision fee to the information providing terminal, and update the accounting information so as to collect predetermined use fee as information fee from the information requesting terminal. After that, the accounting information is held in the user database 3 and the processing ends.

The accounting information used in this case includes the amount information and the account number corresponding to the information requesting terminal and the information providing terminal.

In the above-described example, the route of the information requesting terminal or the information providing terminal is predicted at the base station 2. However, as in another example of the present invention, which will be described hereinafter, it is also possible to predict the route at each mobile station and transmit the position information on the predicted route to the base station 2. In such a case, the position information includes, for example, the present position information, the present traveling speed, the present traveling direction, and the predicted route.

The structure and operation of constituent elements constituting the data transmitting/receiving system of this example will now be described.

Figure 14:
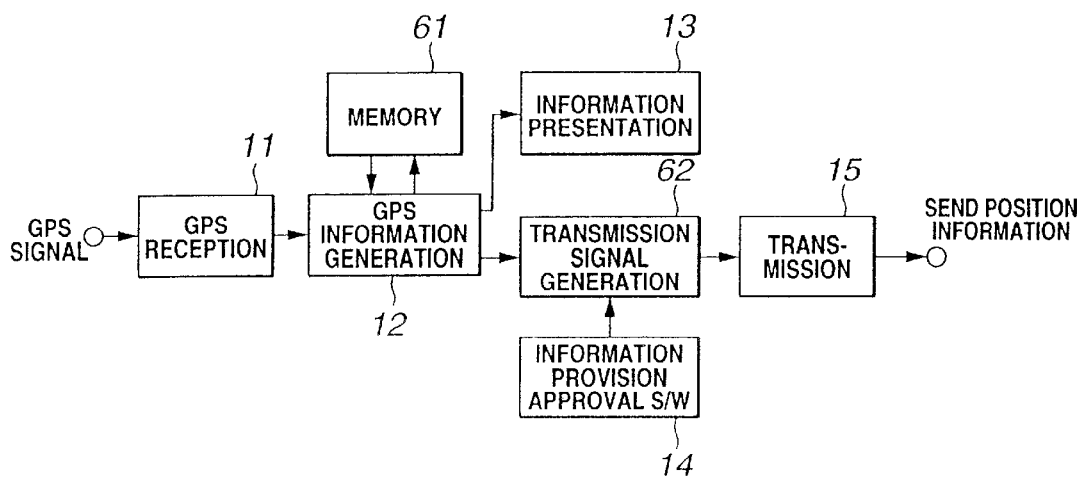
FIG. 14 is a view showing an exemplary structure of main parts of an information providing candidate terminal, which constitutes a second example of the data communication system according to the present invention.

FIG. 14 shows an exemplary structure of the information providing candidate terminal 4 in another example of the present invention. FIG. 14 shows only the main constituent elements for a mobile station to operate as the information providing candidate terminal 4. In FIG. 14, constituent elements corresponding to those of FIG. 3 are denoted by the same numerals and will not be described further in detail.

In FIG. 14, a GPS information generating unit 12 specifies the position indicated by the position (longitude, latitude and altitude) of its automobile on which the terminal is loaded, and the time, on the basis of time information and orbit information contained in a GPS signal. The GPS information generating unit 12 sends the position information and the time information as GPS information to an information presenting unit 13 and also to a memory 61.

In the memory 61, the position information generated every moment by the GPS information generating unit 12 is stored, and the stored position information is read out under the control of the GPS information generating unit 12. The GPS information generating unit 12 sends the position information read out from the memory 61, that is, the history of the position information including the present position, to a transmission signal generating unit 62.

In this example, an information provision approval S/W unit 14 is operated by the user of the information providing candidate terminal 4 when the user explicitly shows to the base station 2 whether or not the user has the intention to provide information to another terminal, that is, the information requesting terminal 6. When the user has the intention to provide information to another terminal, the information provision approval S/W unit 14 is operated, thus outputting and sending a signal to that effect to the transmission signal generating unit 62.

The transmission signal generating unit 62 predicts the route of the terminal on the basis of the history of the position information including the present position read out from the memory 61. Specifically, on the basis of the present position information; the present traveling speed and the present traveling direction, the transmission signal generating unit 62 calculates the predicted route on the assumption of a constant velocity. When a signal indicating that the user has the intention to provide information to another terminal is supplied from the information provision approval S/W unit 14, the transmission signal generating unit 62 generates a transmission signal from the signal supplied from the information provision approval S/W unit 14, the present position information, the present traveling speed information, the present traveling direction information and the predicted route information, and sends the transmission signal to a transmitting unit 15.

Thus, the signal indicating that the user has the intention to provide information to another terminal, and the present position information, the present traveling speed information, the present traveling direction information and the predicted route information of the information providing candidate terminal 4 are transmitted to the base station 2. Therefore, in this example, the base station 2 need not predict the route of the information providing candidate terminal 4.

The flow of processing at the information providing candidate terminal 4 shown by in FIG. 14 is substantially similar to that of FIG. 4. However, in the case of the information providing candidate terminal 4 of this example, the processing to store the acquired position information in the memory 61 is added at step S1 shown in FIG. 4.

Moreover, the information outputted from the transmitting unit 15 at step S3 includes the route information predicted by the information providing candidate terminal 4 on the basis of the position information read out from the memory 61, the present position information, the present traveling speed information, and the present traveling direction information.

Figure 15:
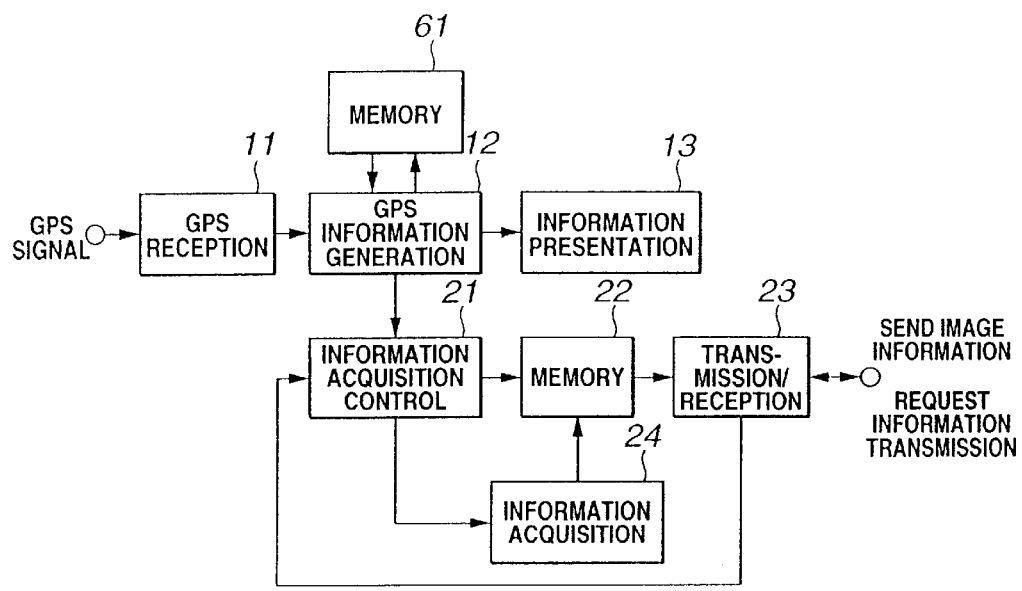
FIG. 15 is a view showing an exemplary structure of main parts of an information providing terminal, which constitutes the second example of the data communication system according to the present invention.

FIG. 15 shows an exemplary structure of the information providing terminal 5 constituting another example of the present invention. FIG. 15 shows only the main constituent elements for a mobile station to operate as the information providing terminal 5. Of the constituent elements shown in FIG. 15, constituent elements common to FIGS. 3, 5 and 14 are denoted by the same numerals and will not be described further in detail.

In FIG. 15, a GPS information generating unit 12 specifies the position of its automobile and the time on the basis of time information and orbit information contained in a GPS signal, and sends the position information and the time information as GPS information to an information presenting unit 13 and also to a memory 61.

In the memory 61, the position information generated every moment by the GPS information generating unit 12 is stored, and the stored position information is read out and sent to an information acquisition control unit 21 under the control of the GPS information generating unit 12.

The information acquisition control unit 21 predicts the route of the terminal, using the GPS information from the GPS information generating unit 12 and the position information read out from the memory 61. The method for route prediction may be similar to the above-described method. When a position requested by an information transmission request signal is reached, the information acquisition control unit 21 controls an information acquiring unit 24 to acquire information at that position and also controls a memory 22 to store the information acquired by the information acquiring unit 24.

After that, the information acquisition control unit 21 causes the memory 22 to read out and send the information stored in the memory 22 to a transmitting/receiving unit 23. When an information retransmission request is transmitted, the information acquisition control unit 21 causes the memory 22 to read out and send past information stored in the memory 22 to the transmitting/receiving unit 23.

The flow of processing at the information providing terminal 5 shown in FIG. 15 is substantially similar to that of FIG. 6. However, in the information providing terminal 5 of this example, determination using the route information predicted from the GPS information and the position information stored in the memory 61 is carried out at step S12 shown in FIG. 6.

Figure 16:
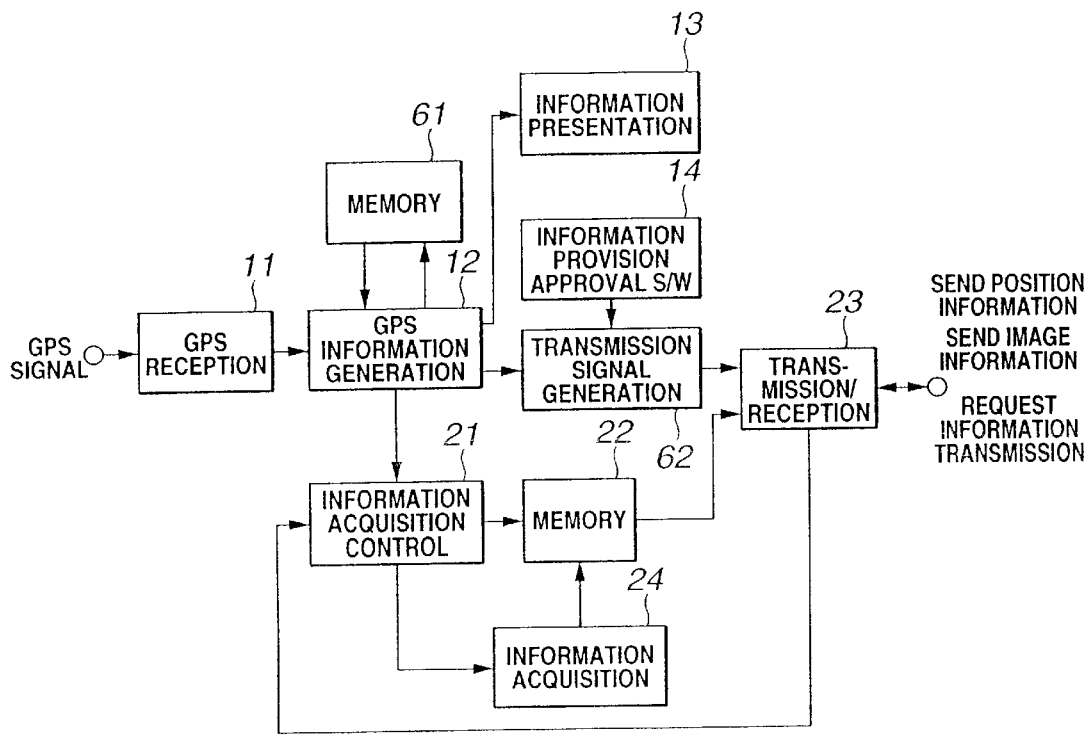
FIG. 16 is a view showing an exemplary structure of main parts of a terminal having both functions of an information providing candidate terminal and an information providing terminal.

FIG. 16 shows the structure having both functions of the information providing candidate terminal and the information providing terminal shown in FIGS. 14 and 15. Of the constituent elements shown in FIG. 16, constituent elements corresponding to those of FIGS. 14 and 15 are denoted by the same numerals and will not be described further in detail.

In FIG. 16, position information stored in a memory 61 is read out and sent to a transmission signal generating unit 62 under the control of a GPS information generating unit 12.

The transmission signal generating unit 62 predicts the route of the terminal on the basis of the history of the position information including the present position read out from the memory 61. The method for route prediction may be similar to the above-described method. When a signal indicating that the user has the intention to provide information to another terminal is supplied from an information provision approval S/W unit 14, the transmission signal generating unit 62 generates a transmission signal from the signal supplied from the information provision approval S/W unit 14 and the route information, and sends the transmission signal to a transmitting/receiving unit 23.

An information acquisition control unit 21 predicts the route of the terminal, using the GPS signal from the GPS information generating unit 12 and the position information read out from the memory 61. The route prediction processing at the transmission signal generating unit 62 and the information acquisition control unit 21 may be made common. When a position requested by an information transmission, request signal is reached, the information acquisition control unit 21, controls an information acquiring unit 24 to acquire information at that position and also controls a memory 22 to store the information acquired by the information acquiring unit 24. After that, the information acquisition control unit 21 causes the memory 22 to read out and send the information stored in the memory 22 to the transmitting/receiving unit 23.

Figure 17:
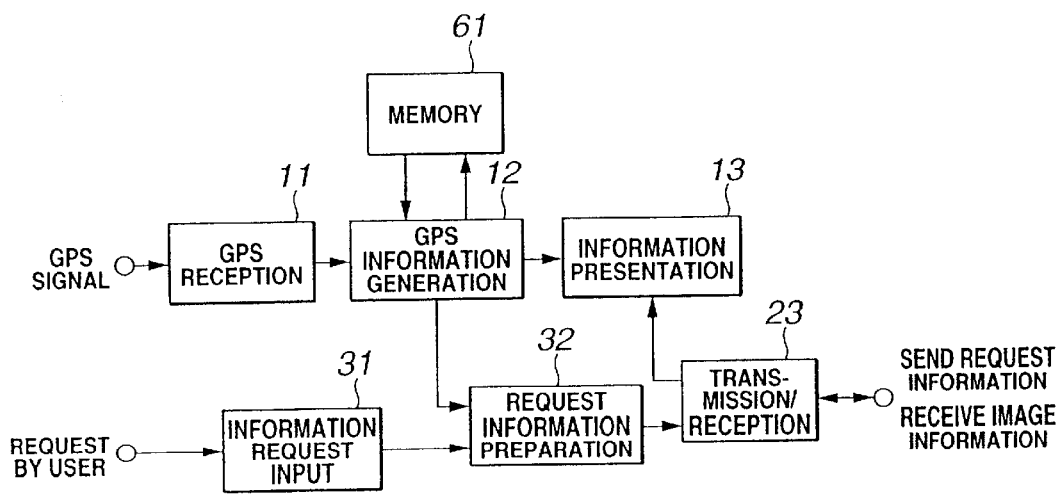
FIG. 17 is a view showing an exemplary structure of main parts of an information requesting terminal.

FIG. 17 shows an exemplary structure of the information requesting terminal 6 constituting another example of the present invention. FIG. 17 shows only the main constituent elements for a mobile station to operate as the information requesting terminal 6. Of the constituent elements shown in FIG. 16, constituent elements corresponding to those shown in FIGS. 8, 14 and 15 are denoted by the same numerals and will not be described further in detail.

In FIG. 17, position information from a GPS information generating unit 12 is stored in a memory 61.

A request information preparing unit 32 generates request information. In this case, the request information preparing unit 32 predicts the route of the terminal by using the history of the position information stored in the memory 61 as well as the position information from the GPS information generating unit 12 as the position information of the automobile, and includes the route information, the present position information, the present traveling speed information and the present traveling direction information in the request information. Similar to the above-described case, the route of the information requesting terminal 6 can be predicted on the assumption of a constant velocity, on the basis of the present position information, the present traveling speed information and the present traveling direction information. The request information is sent to the base station 2 via a transmitting/receiving unit 23.

The flow of processing at the information requesting terminal 6 shown in FIG. 17 is substantially similar to that of FIG. 9. However, in the case of the information requesting terminal 6 of this example, the processing to store the acquired position information in the memory 61 is added at step S31 shown in FIG. 9, and the route information predicted from the position information read out from the memory 61, the present position information, the present traveling speed information and the present traveling direction information are included in the request information prepared at step S39.

Figure 18:
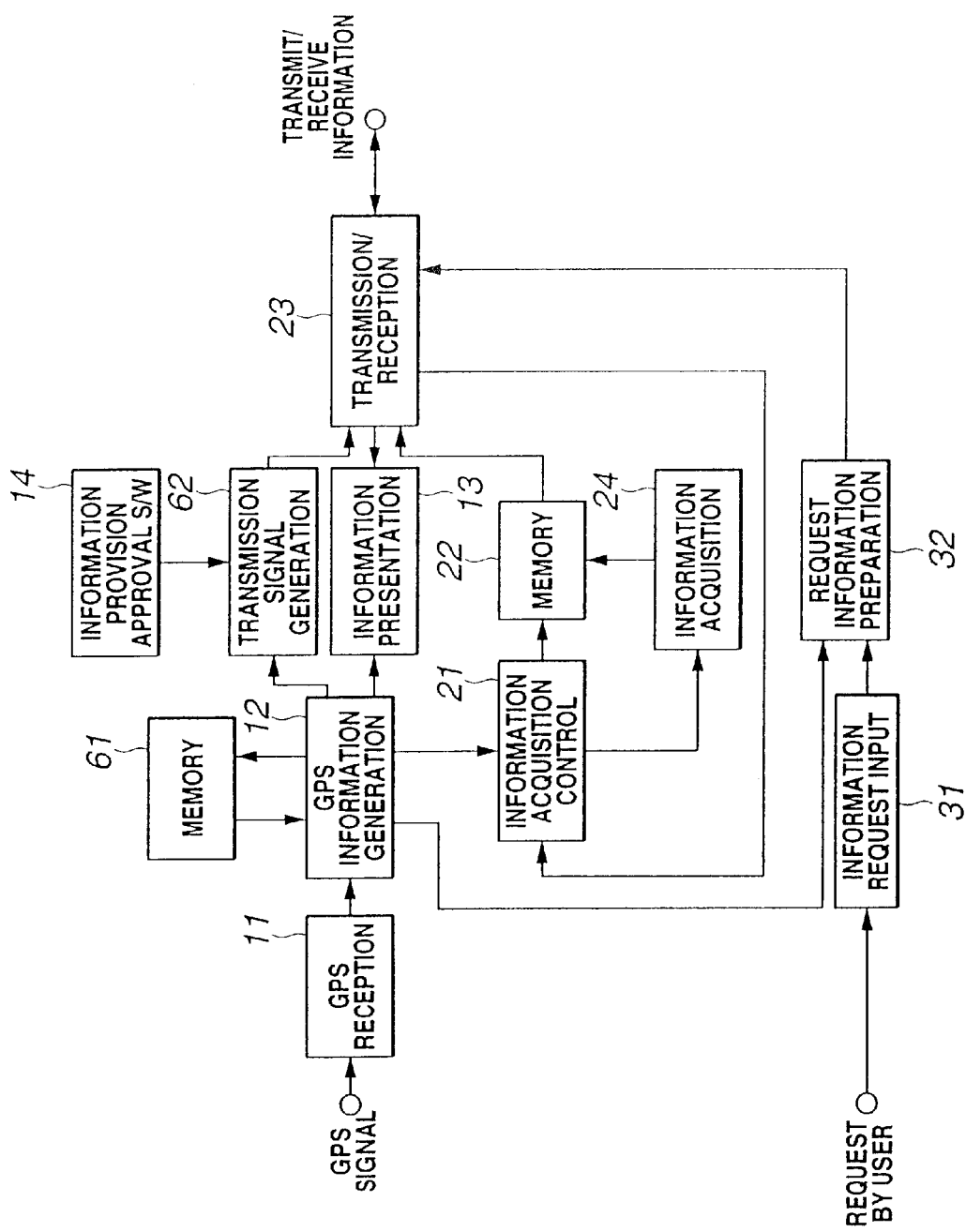
FIG. 18 is a view showing an exemplary structure of main parts of a terminal having the functions of an information providing candidate terminal, an information providing terminal and an information requesting terminal.

FIG. 18 shows the structure of main parts of a terminal having all the functions of the information providing candidate terminal, the information providing terminal and the information requesting terminal of another example of the present invention. Of the constituent elements shown in FIG. 18, constituent elements corresponding to those in FIGS. 14, 15, 16 and 17 are denoted by the same numerals and will not be described further in detail.

In the structure as shown in FIG. 18, position information stored in a memory 61 is read out and sent to a transmission signal generating unit 62 under the control of a GPS information generating unit 12. The transmission signal generating unit 62 predicts the route of the terminal on the basis of the history of the, position information including the present position read out from the memory 61. The method for route prediction may be similar to the above-described method. When a signal indicating that the user has the intention to provide information to another terminal is supplied from an information provision approval S/W unit 14, the transmission signal generating unit 62 generates a transmission signal from the signal supplied from the information provision approval S/W unit 14, the route information, the present position information, the present traveling speed information and the present traveling direction information, and sends the transmission signal to a transmitting/receiving unit 23.

An information acquisition control unit 21 predicts the route of the terminal, using the GPS signal from the GPS information generating unit 12 and the position information read out from the memory 61. The route prediction processing at the transmission signal generating unit 62 and the information acquisition control unit 21 may be made common. When a position requested by an information transmission request signal is reached, the information acquisition control unit 21 controls an information acquiring unit 24 to acquire information at that position and also controls a memory 22 to store the information acquired by the information acquiring unit 24. After that, the information acquisition control unit 21 causes the memory 22 to read out and send the information stored in the memory 22 to the transmitting/receiving unit 23.

A request information preparing unit 32 predicts the route of the terminal by, using the history of the position information stored in the memory 61 as well as the position information from the GPS information generating unit 12, and includes the route information, the present position information; the present traveling speed, information and the present traveling direction information in the request information. The route prediction processing at the transmission signal generating unit 62, the information acquisition control unit 21 and the request information preparing unit 32 may be made common. The request information is sent to the base station 2 via the transmitting/receiving unit 23.

Figure 19:
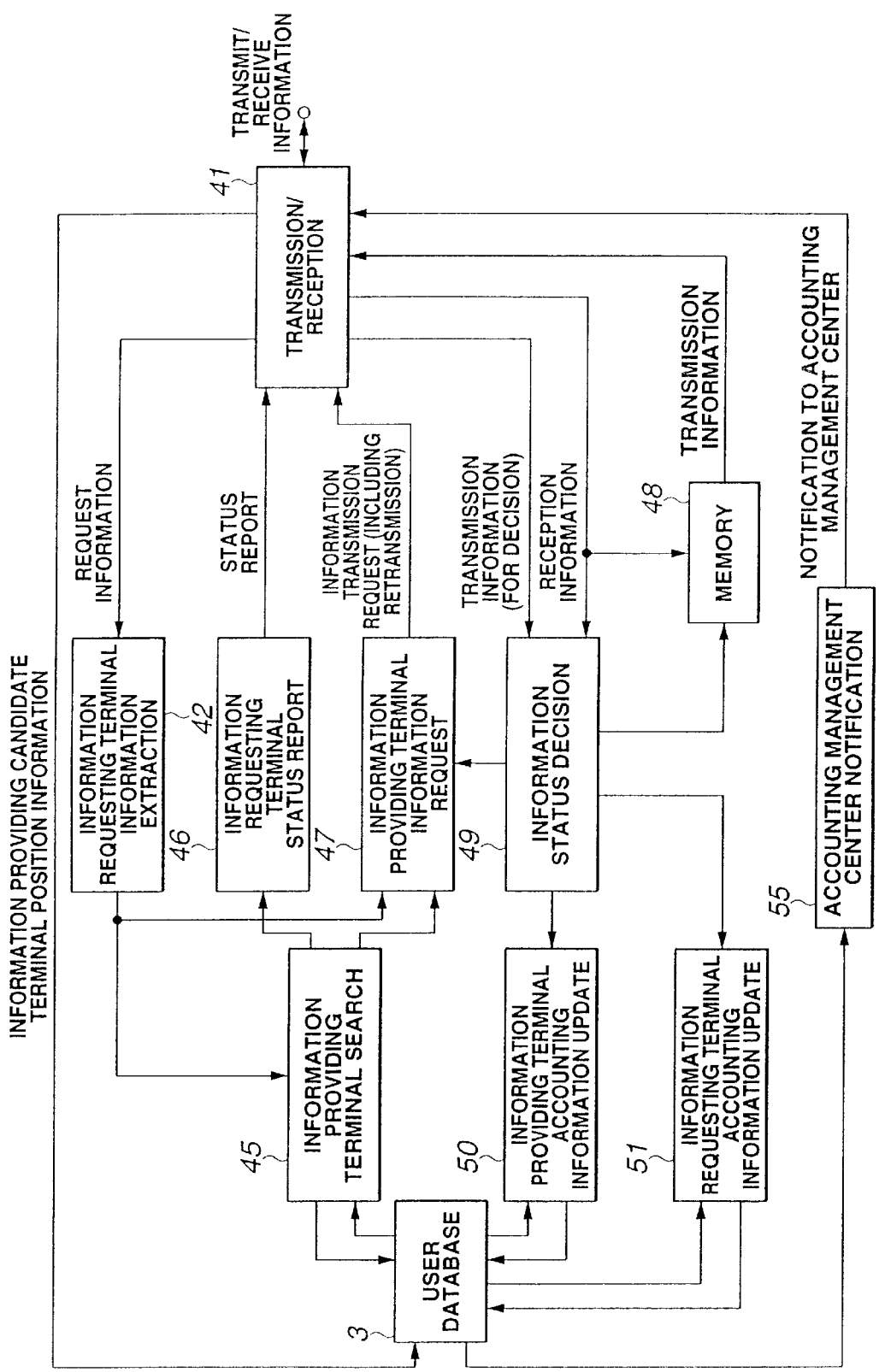
FIG. 19 is a view showing an exemplary structure of main parts of a base station.

FIG. 19 shows the structure of main parts of the base station 2 constituting another example of the present invention. Of the constituent elements shown in FIG. 19, constituent elements corresponding to those of FIG. 11 are denoted by the same numerals and will not be described further in detail.

The base station 2 shown in FIG. 19 need not have the route predicting unit 43 of FIG. 11. An information extracting unit 42 sends the route information, the present position information, the present traveling speed information and the present traveling direction information, of the information extracted from the request information supplied from the information requesting terminal 6, to a providing terminal search unit 45.

The providing terminal search unit 45 determines whether or not an information providing candidate terminal exists on the route of the information requesting terminal or at a position desired by the user of the information requesting terminal, by using the position information of each information providing candidate terminal stored in a user database 3, and the route information, the present position information, the present a traveling speed information and the present traveling direction information extracted from the request information.

The other parts of the processing are similar to those shown in FIG. 11.

The flow of processing at the base station 2 shown in FIG. 19 is substantially similar to that of FIGS. 12 and 13. However, in the case of the base station 2 of this example, the processing of steps S54 and S55 shown in FIG. 12 is not necessary.

Figure 20:
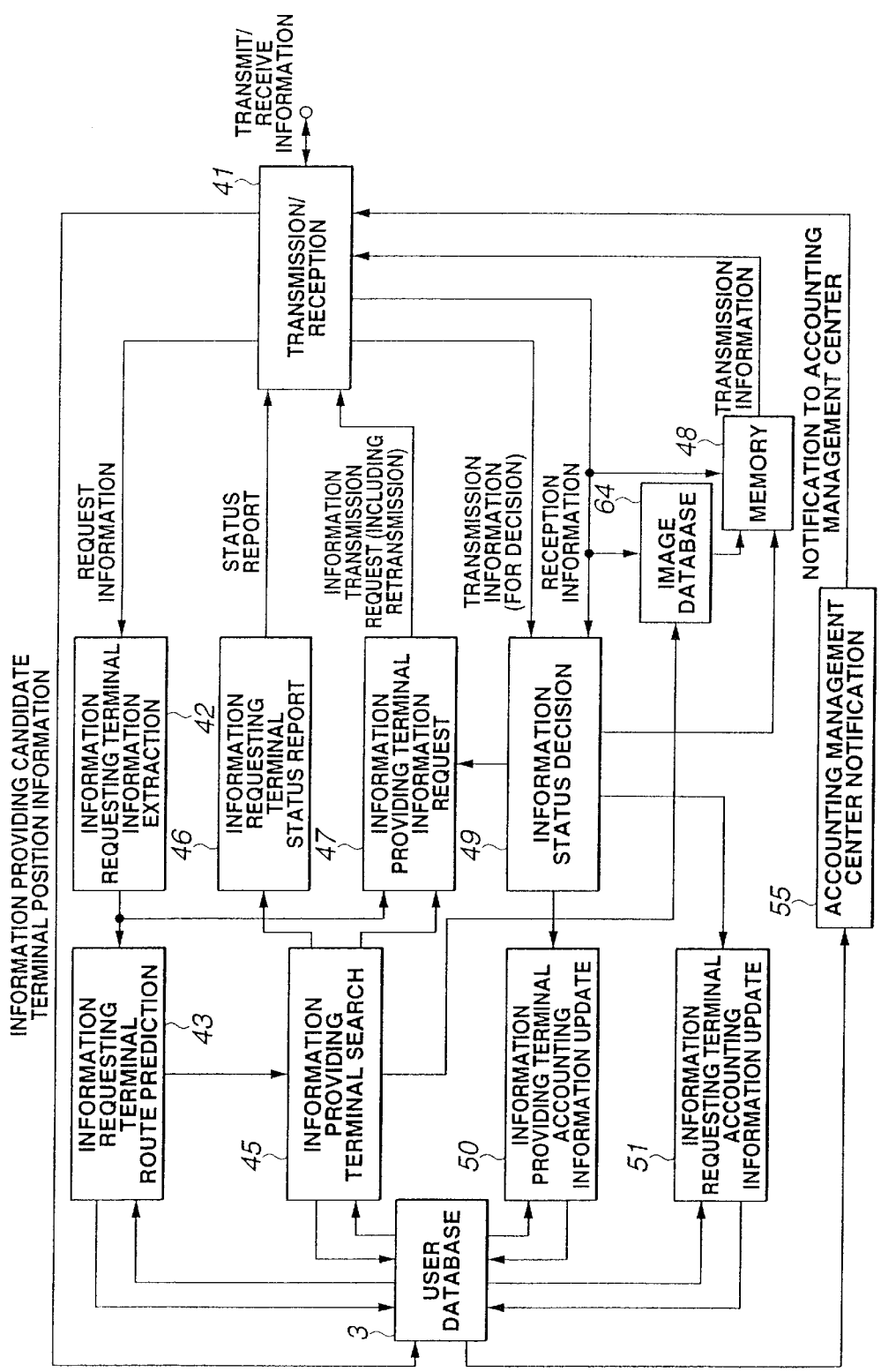
FIG. 20 is a view showing an exemplary structure of main parts of a base station, which constitutes a third example of the data communication system according to the present invention.

In the above-described system according to the present invention, the base station 2 has the user database 3 for holding the position information and the accounting information. However, it is also possible to provide an image database 64 for storing image information which is transmitted/received in the past, as shown in FIG. 20, and to read out and provide image information from the image database 64 to the information requesting terminal 6 when necessary. Of the constituent elements shown in FIG. 20, constituent elements corresponding to those of FIG. 11 are denoted by the same numerals and will not be described further in detail.

In the database 64 of the base station shown in FIG. 20, image information transmitted from the information providing terminal 5 in the past is stored. If image information corresponding to a request from the information requesting terminal 6 is stored in the image database 64, the image information is read out, then stored in a memory 48, then read out and sent to a transmitting/receiving unit 41; and transmitted to the information requesting terminal 6.

Thus, in the case where the image information corresponding to the request from the information requesting terminal 6 is stored in the image database 64, it is possible to eliminate the processing to receive the provision of information from the information providing terminal every time an information request is made from the information requesting terminal 6.

Moreover, in the case of providing image information stored in the image database 64 to the information requesting terminal 6, by constructing a system which eliminates the need to pay the information provision fee to the information providing terminal, it is possible to increase the profit for the manager of the system and also to lower the use fee paid by the information requesting terminal.

Figure 21:
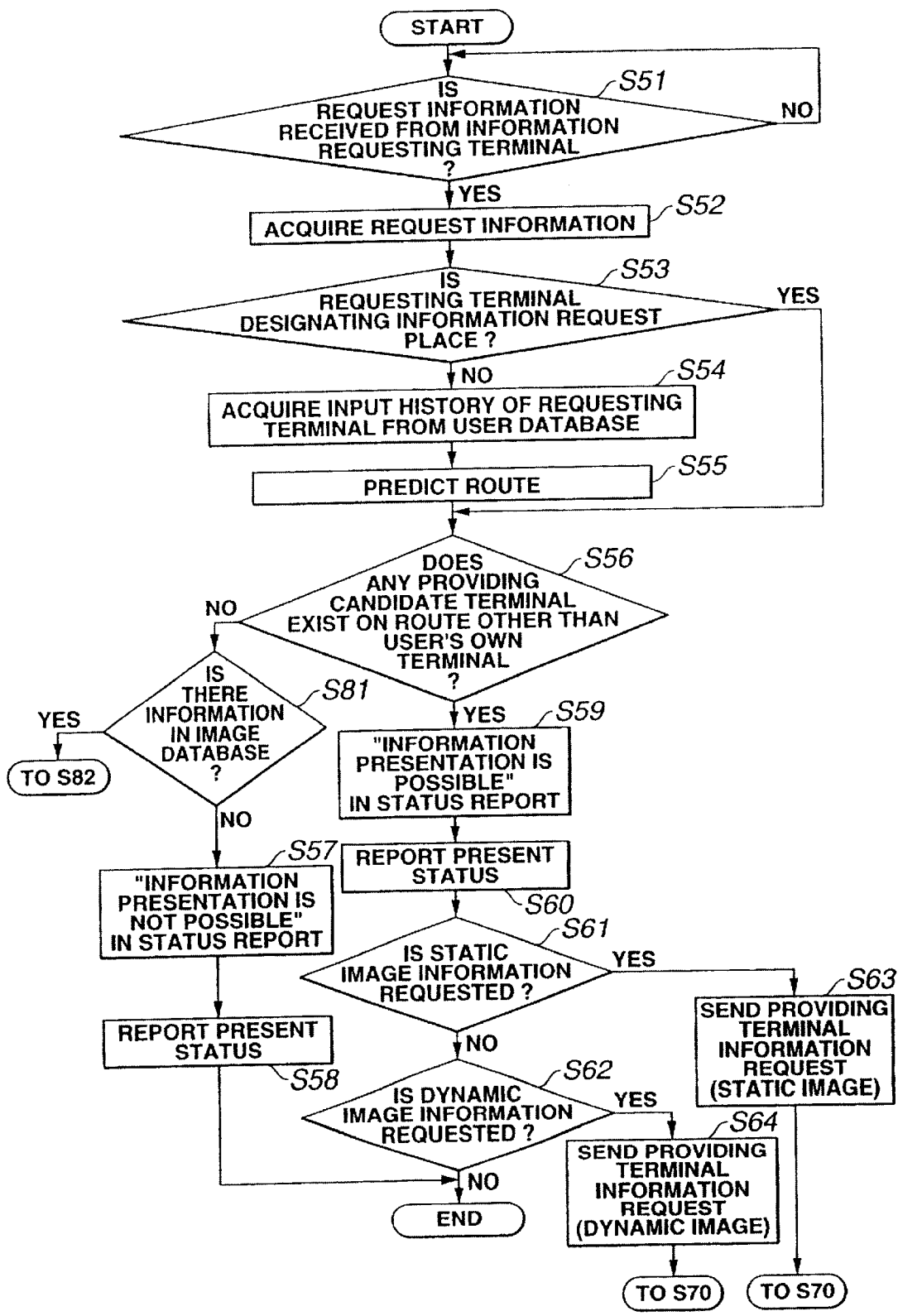
FIG. 21 is a flowchart showing the former half of the flow of principal processing at the base station.
Figure 22:
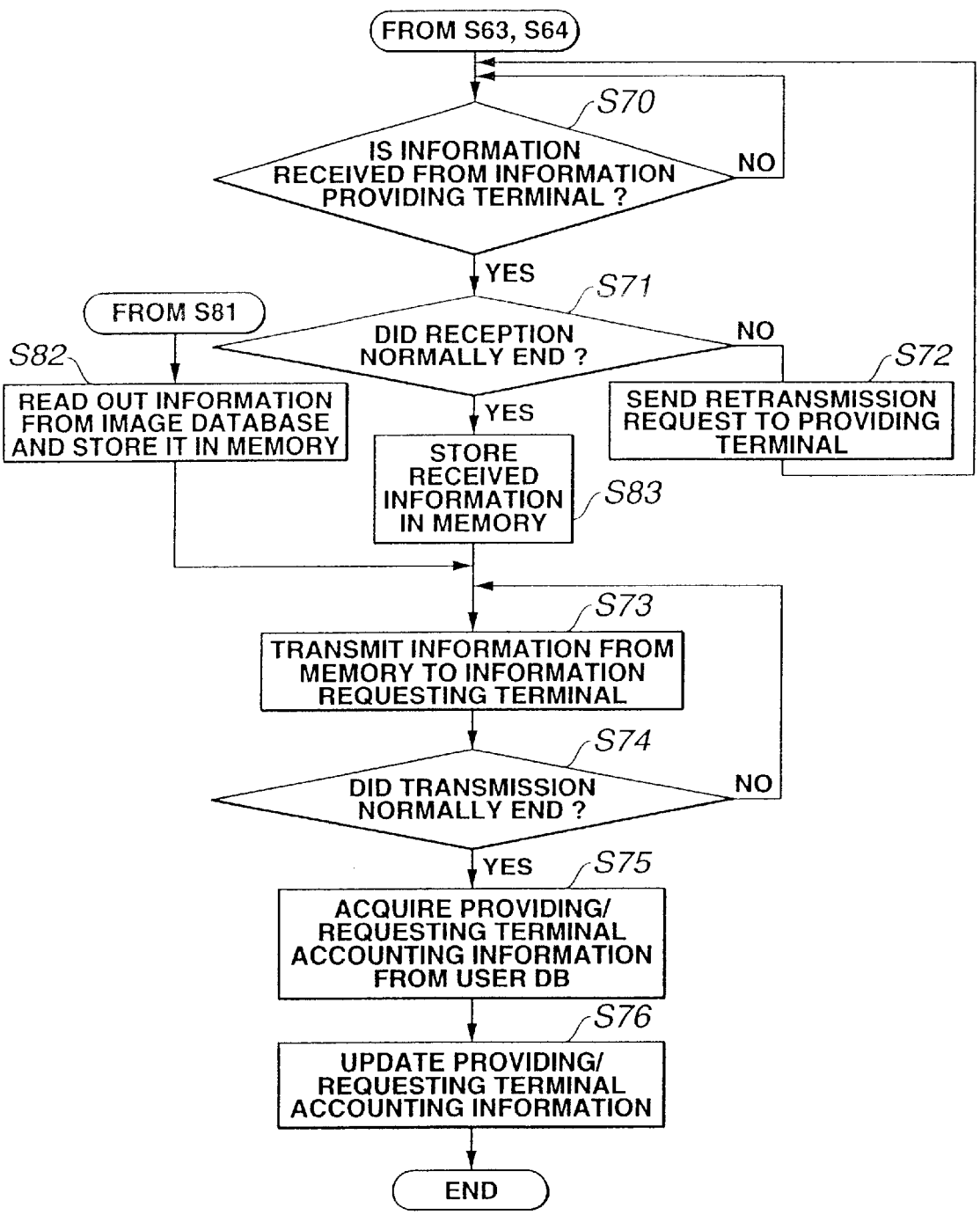
FIG. 22 is a flowchart showing the latter half of the flow of principal processing at the base station.

FIGS. 21 and 22 show a series of principal operations of the base station 2 constituting the system shown in FIG. 20. In FIGS. 21 and 22, the same steps as in FIGS. 12 and 13 are denoted by the same numerals and will not be described further in detail.

In the case of the system shown in FIG. 20, if it is determined at step S56 of FIG. 21 that an information providing candidate terminal does not exist, the processing goes to step S81. At step S81, the providing terminal search unit 45 determines whether or not image information corresponding to a position requested by the information requesting terminal is stored in the image database 64. If it is determined that image information is not stored, the processing goes to step S57. If it is determined that image information is stored, the processing goes to step S82 of FIG. 22.

At step S82, the providing terminal search unit 45 causes the image database 64 to read out the image information corresponding to the position requested, by the information requesting terminal and to store it in the memory 48. After that, the processing goes to step S73.

In the case of the system shown in FIG. 20, the processing of step S83 to store received information in the memory 48 is particularly described as the processing, subsequent to step S71 of FIG. 22. However, the processing of step S83 is not shown in FIG. 13.

Figure 23:
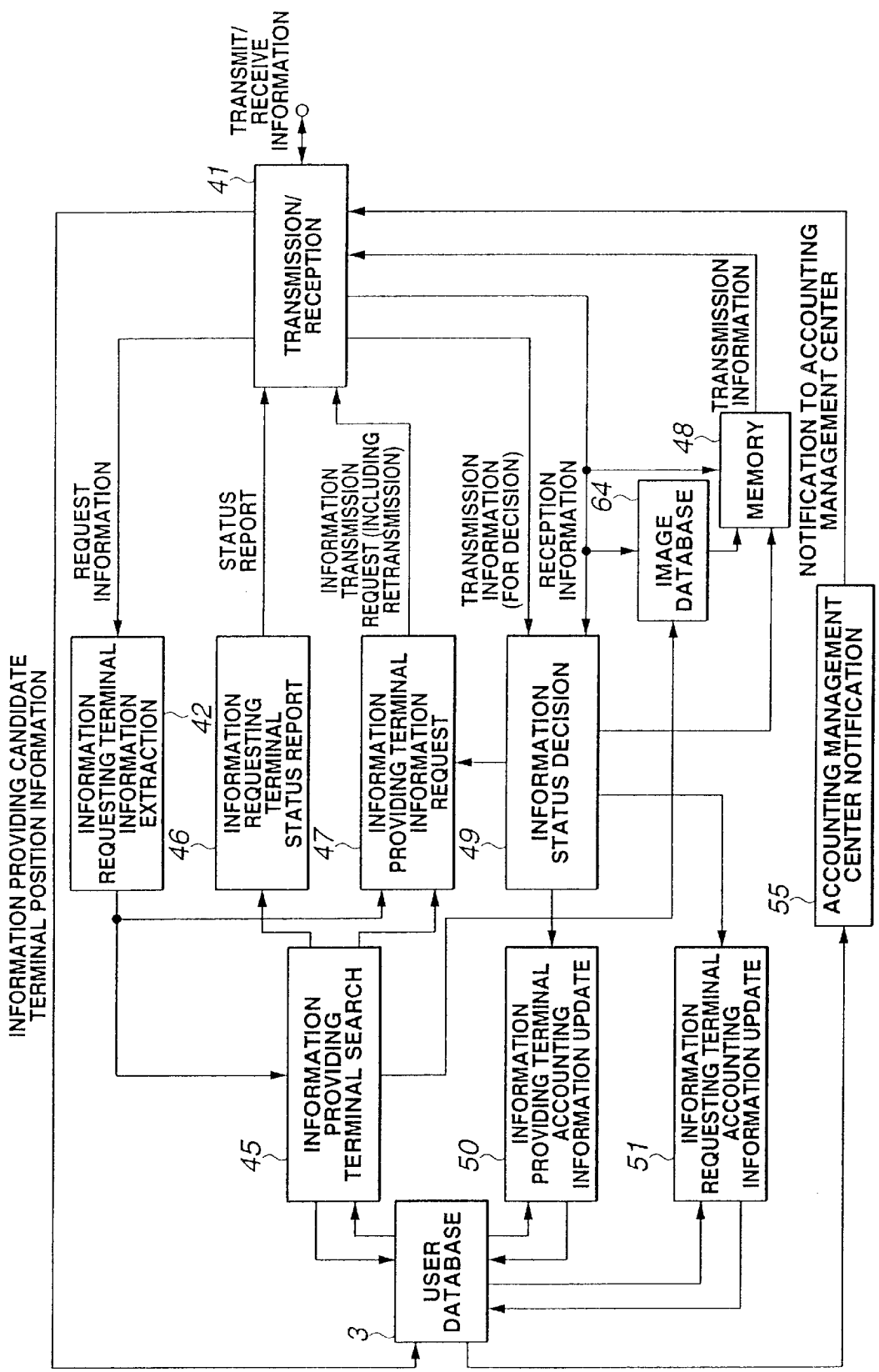
FIG. 23 is a view showing an exemplary structure of main parts of base station, which constitutes a fourth example of the data communication system according to the present invention.

The structure shown in FIG. 20 is constituted by applying the image database 64 to the structure shown in FIG. 11. By applying the image database 64 to the structure shown in FIG. 19, the base station has a structure as shown in FIG. 23. The structure of FIG. 23 will not be described in detail because the image database 64 similar to the image database shown in FIG. 20 is simply added to the structure of FIG. 19.

In the above-described first to fourth examples, one information providing terminal 5 is designated from the information providing candidate terminals, and the image information provided from the designated information providing terminal 5 is presented on the information presenting unit 13 of the information requesting terminal 6, as a matter of convenience. However, it is also possible to simultaneously display image information from a plurality of other mobile stations, that is, small images which will be described later, and to allow the user of the information requesting terminal to select desired image information from the image information from the other mobile stations, as in the following example. The fifth example can be applied to any of the above-described first to fourth examples.

In the above-described first to fourth examples, image information is provided from a mobile station which is the information providing terminal. However, if when each mobile station is the information providing candidate terminal, the information providing candidate terminal can acquire image information, for example, information of a small image which will be described later, and can transmit the acquired image information to the base station, it is possible in the fifth example to simultaneously display the image information of small images from the plurality of information providing candidate terminals on the information presenting unit 13 of the information requesting terminal 6 and to allow the user of the information requesting terminal to select desired image information from the image information from the information providing candidate terminals. In the following description, it is assumed that when each mobile station is the information providing candidate terminal, the information providing candidate terminal can acquire image information and can transmit the acquired image information to the base station. Since the information providing candidate terminal originally has the function of the information providing terminal as described above, it is a matter of course that the information providing candidate terminal can transmit image information to the base station as in the fifth embodiment.

Figure 24:
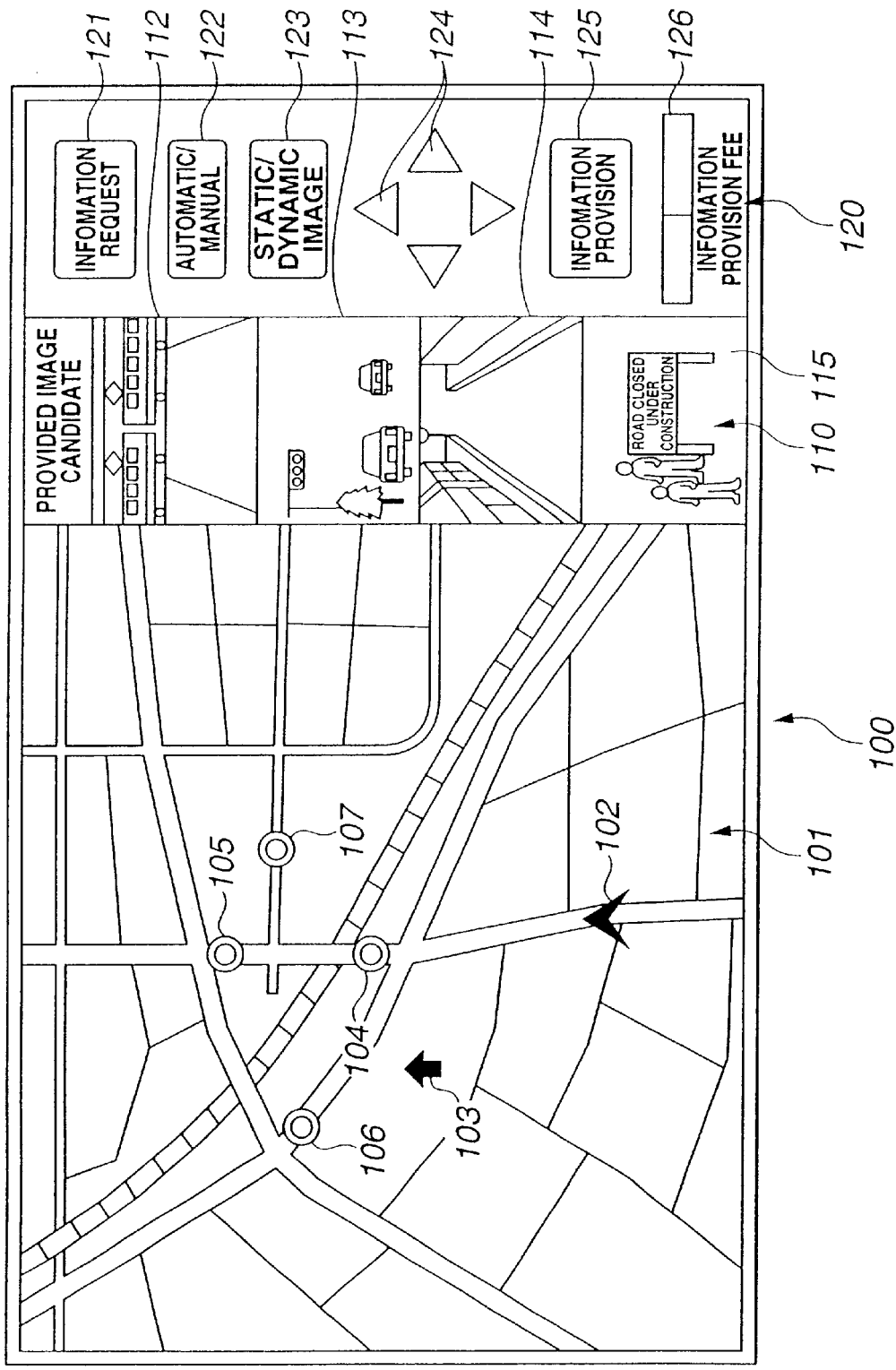
FIG. 24 is a view showing an exemplary display screen of an information presenting unit of a terminal, which constitutes a fifth example of the data communication system according to the present invention.

FIG. 24 shows an exemplary display on the information presenting unit 13 of the information requesting terminal 6. In this example, the information requesting terminal has all the functions of the information providing candidate terminal and the information providing terminal.

In FIG. 24, a main image display area 101 for display a main image, a sub image display. area 110 for displaying a sub image, and an operation area 120 in which operation buttons to be operated by the user are arranged or displayed, are displayed on a display screen 100 of the information presenting unit 13.

In the main image display area 101 in the case where the terminal functions as a typical car navigation device, a map showing the vicinity of the position of the user's car, for example, a map which is easy to recognize such as a plan view or a bird's eye view, a user's car mark 102 representing the position of the user's automobile and its traveling direction (upward, in this example), and a cursor 103 are displayed.

In the operation area 120, there are arranged or displayed, for example, an information request button 121 (included in the information request input unit 31) operated by the user when requesting the base station to transmit information, an automatic/manual switching button 122 for enabling automatic or manual selection of the information providing terminal, a static image/dynamic image selection button 123 (included in the information request input unit 31) for requesting a static image or a dynamic image as information, cursor keys 124 (included in the information request input unit 31) used for moving the cursor 103 in FIG. 24 and for selecting each menu item when menu items, not shown, are displayed, an information provision button 125 (equivalent to the information provision approval S/W unit 14) operated for causing the terminal to operate as the information providing candidate terminal, and an information provision fee display bar 126 for displaying the information provision fee at the present time point in a visually recognizable manner when the terminal operates as the information providing candidate terminal. These buttons and keys may be buttons and keys on a touch panel on the display screen 100 so that the portions corresponding to the buttons and keys are touched to operate. Alternatively, the cursor 103 may be moved onto each button or key by a remote controller, not shown, and these buttons and keys may be operated by clicking on the remote controller.

When the information request button 121 in the operation area 120 is ON to cause the mobile station of this example to operate as the information requesting terminal as described above, candidate car marks (in the example of FIG. 24, four candidate car marks 104 to 107) representing a plurality of information providing candidate terminals in the traveling direction of the user's automobile are displayed together with the map and the user's car mark 102 in the main image display area 101.

In the sub image display area 110, small images 112 to 115 are display which are provided from the information providing candidate terminals corresponding to the four candidate car marks 104 to 107 via the base station.

In the example of FIG. 24, the small image 112 is displayed as an image provided from the information providing candidate terminal corresponding to the candidate car mark 104, and a small image 113 is displayed as an image provided from the information providing candidate terminal corresponding to the candidate car mark 105. The small image 114 is displayed as an image provided from the information providing candidate terminal corresponding to the candidate car mark 106, and the small image 115 is displayed as an image provided from the information providing candidate, terminal corresponding to the candidate car mark 107.

Specifically, the information providing candidate terminal corresponding to the candidate car mark 104 is situated before a railroad crossing, and the information providing candidate terminal corresponding to the candidate car mark 105 is situated before an intersection on Route A. The information providing candidate terminal corresponding to the candidate car mark 106 is situated before another intersection on Route A, and the information providing candidate terminal corresponding to the candidate car mark 107 is situated on the road after turning right at the first intersection past the railroad crossing.

Therefore, the user of the information requesting terminal can learn that the user cannot go through the railroad crossing because a train is passing there, from the image provided from the information providing candidate terminal corresponding to the candidate car mark 104. The user can also learn that there is traffic congestion at the intersection on Route A, from the image provided from the information providing candidate terminal corresponding to the candidate car mark 105. The user can also learn that the road on which the candidate car mark 107 is, situated is under construction and closed, from the image provided from the information providing candidate terminal corresponding to the candidate car mark 107. Moreover, the user can learn that the intersection which the candidate car mark 106 is approaching is not crowded and is easy to go through, from the image provided form the information providing candidate terminal corresponding to the candidate car mark 106.

When the automatic/manual switching button 122 in the operation area 120 is operated to switch to manual operation so as to allow the user of the information requesting terminal to operate the cursor keys 124 or operate the remote controller and thus the cursor 103 is moved onto a desired small image in the sub image display area 110 so as to select the desired small image by clicking, the information providing candidate terminal corresponding to the selected small image is selected as the information providing terminal, from the information providing candidate terminals corresponding the respective small images, and the image provided from the information providing terminal is displayed as an enlarged image in the main image area 101.

In this example, as the user directly selects a desired small image from the small images by manual operation, the information providing terminal is selected from the information providing candidate terminals corresponding to the respective small images. However, it is also possible to operate the automatic/manual switching button 122 in the operation area 120 to switch to automatic operation and to automatically select the information providing terminal from the information providing candidate terminals.

As a technique for automatic selection, for example, an information providing candidate terminal having the best communication state or an information providing candidate terminal having the best image characteristic quantity, for example, the best histogram, may be selected from a plurality of information providing candidate terminals.

As another technique for automatic selection, after the user searches for a route to the destination by the above-described car navigation device, the terminal situated on the route may be automatically selected from a plurality of information providing candidate terminals.

Figure 25:
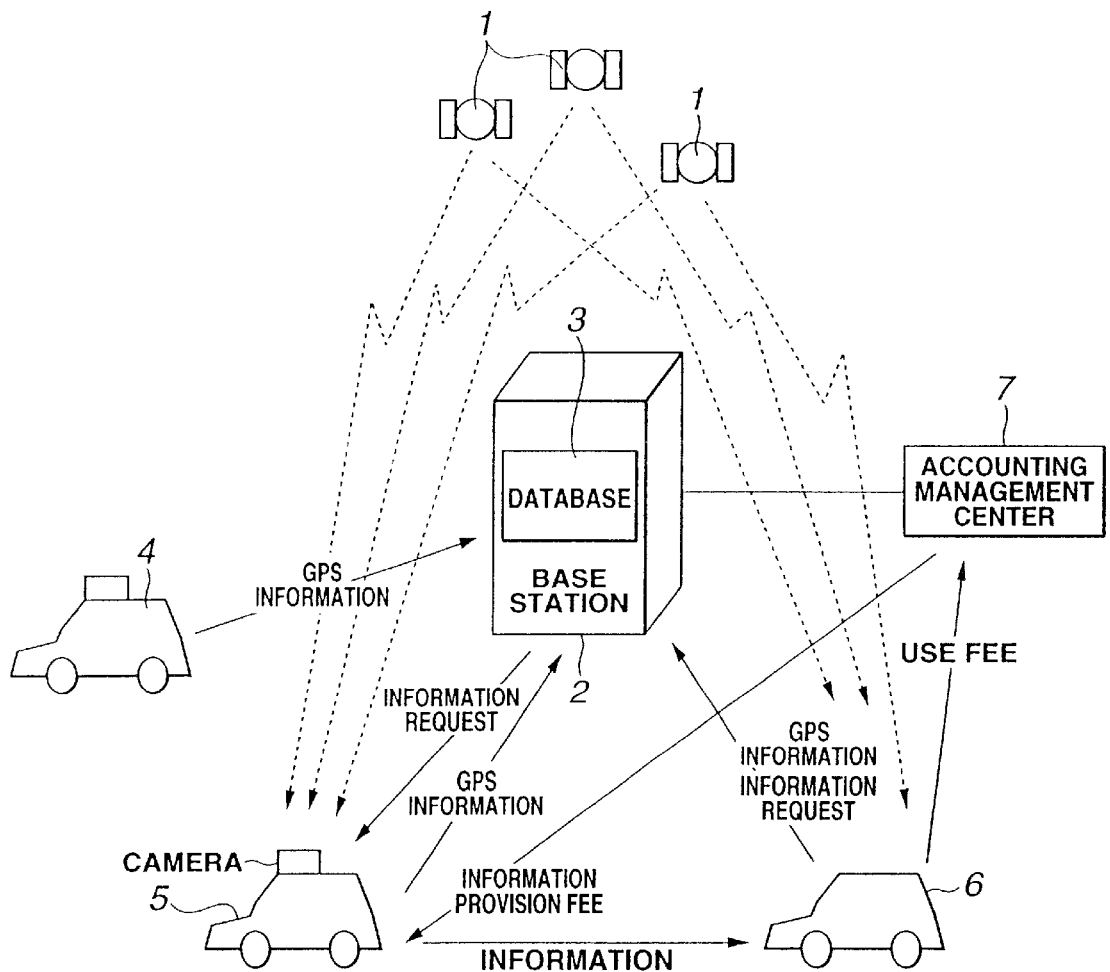
FIG. 25 is a view showing the schematic structure of a data transmission/reception system, which constitutes a sixth example of the data communication system according to the present invention.

In the above-described examples, the information acquired by the information providing terminal 5 is provided to the information requesting terminal 6 via the base station 2. However, it is also possible to provide the information acquired by the information providing terminal 5 directly to the information requesting terminal, as in the example shown in FIG. 25. The example shown in FIG. 25 can be applied to any of the system shown in FIG. 1, the system having the structure shown in FIG. 14 and the system having the structure shown in FIG. 24. Moreover, if the information providing terminal has storage means for storing past image information similarly to the image database of the base station, it is possible to provide the information stored in the information providing terminal in the past directly to the information requesting terminal, in the system shown in FIG. 25. The constituent elements of the system shown in FIG. 25 are substantially similar to the above-described corresponding constituent elements and therefore will not be described further in detail.

As described above, the system according to the present invention realizes a higher degree of freedom with respect to the range of information provision, compared with the information provision from a fixed camera or the like. That is, it is possible to easily acquire information about the conditions at a desired position on the route to be taken by a certain mobile terminal, for example, image information at a future position on the route of the user's automobile. In other words, it is possible to provide information acquired by a mobile terminal existing at a certain position to another mobile terminal existing at a different position, when necessary.

The above-described series of processing can be carried out by hardware or by software. In the case of carrying out the series of processing by software, a program constituting the software is installed in a computer which is incorporated in the terminal as dedicated hardware, or in a general-purpose computer.

A program storage medium will now be described in which the program for executing the series of processing is stored and which is used for installing the program in a computer and enabling the program to be executed by the computer.

Specifically, the program for executing the above-described processing can be stored in advance on a hard disk or a semiconductor memory as a storage medium provided within a computer. The program can be temporarily or permanently stored in a recording medium such as a floppy disk, a CD-ROM (compact disc read-only memory), an MO (magneto-optical) disc, a DVD (digital versatile disc), a magnetic disk or a semiconductor memory.

Other than installing from the program storage medium as described above, this program can be transferred by radio transfer to a computer from a downloading site via a digital broadcasting satellite, or transferred by wired transfer to a computer via a LAN (local area network) or the Internet, and can be installed on a hard disk provided within the computer.

In the present invention, the steps describing the program for carrying out various processing need not necessarily carried out in time series in the order described as the flowcharts. These steps may include the processing which is carried out in parallel or individually.

Figure 26:
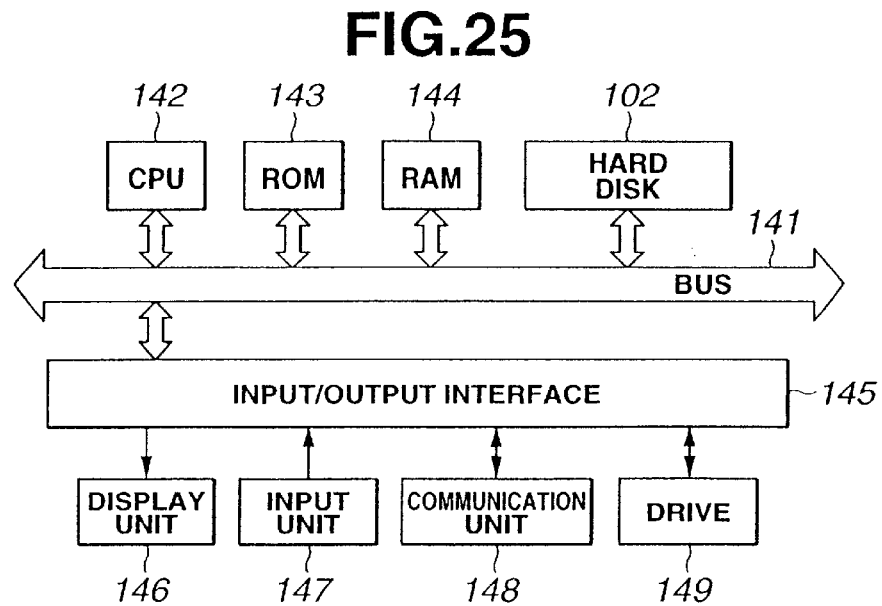
FIG. 26 is a block diagram showing an exemplary structure of a computer to which the present invention is applied.

FIG. 26 shows an exemplary structure of the above-described computer.

The computer shown in FIG. 26 has a CPU (central processing unit) 142 provided therein. The CPU 142 is connected with an input/output interface 145 via a bus 141. When an input unit 147 constituted by a keyboard, a mouse and the like is operated by the user to input a command via the input/output interface 145, the CPU 142 executes a program stored in a ROM (read-only memory) 143 corresponding to the semiconductor memory in response to the command. The CPU 142 loads, on a RAM (random access memory) 144, a program stored on a hard disk 102, a program transferred from the satellite or network, received by a communication unit 148 and then installed on the hard disk 102, or a program read out from a floppy disk, a CD-ROM, an MO disc, a DVD or a magnetic disk loaded on a drive 149 and installed on the hard disk 102, and executes the installed program. The CPU 142 outputs, when necessary, the processing result to a display unit 146 constituted by an LCD (liquid crystal display) or the like, for example, via the input/output interface 145.

Industrial Applicability

As described above, according to the present invention, a request signal containing position information is transmitted from a first mobile unit to a base station, and the base station searches for a second mobile unit in accordance with the position information contained in the request signal and causes the second mobile unit thus searched for to transmit data, thus transmitting the data to the first mobile unit, or causes the second mobile unit to transmit data directly to the first mobile unit. Thus, it is possible to easily acquire information about the conditions at a desired position on the route to be taken by a certain mobile unit, that is, to provide information acquired by a mobile unit existing at a certain position to another mobile terminal existing at a different position, when necessary. According to the present invention, a higher degree of freedom is realized with respect to the range of information provision, compared with the information provision from a fixed camera or the like.

Moreover, according to the present invention, it is possible to pay the right compensation or collect the fee when providing data or receiving the provision of data, so as to update the accounting information of the users corresponding to the first and second mobile units on the basis of data; returned from the second mobile unit to the first mobile unit.

What is claimed is:

1. A data communication system comprising:

a first mobile unit having first transmission/reception means for transmitting a first request signal containing position information to a base station and receiving data corresponding to the first request signal from the base station;

a base station having search means for searching for a second mobile unit in accordance with the position information contained in the first request signal, and second transmission/reception means for receiving the first request signal, transmitting a second request signal to the second mobile unit thus searched for, and returning data returned from the second mobile unit to the first mobile unit; and a second mobile unit having input means for inputting data, and third transmission/reception means for receiving the second request signal and returning the data inputted by the input means in accordance with the second request signal to the base station;

wherein the base station has storage means for storing the data returned from the second mobile unit and the base station reads out data corresponding to the first request signal from data stored in the storage means in the past and returns the data to the first mobile unit.

2. The data communication system as claimed in claim 1, wherein the search means of the base station predicts a traveling route of the first mobile unit on the basis of the position information contained in the first request signal, and searches for the second mobile unit by using the predicted traveling route.

3. The data communication system as claimed in claim 1, wherein the first mobile unit has selection means for selecting desired data from a plurality of data received in accordance with the first request signal.

4. A data communication system comprising:

a first mobile unit having first transmission/reception means for transmitting a first request signal containing position information to a base station and receiving data corresponding to the first request signal from the base station;

a base station having search means for searching for a second mobile unit in accordance with the position information contained in the first request signal, and second transmission/reception means for receiving the first request signal, transmitting a second request signal to the second mobile unit thus searched for, and returning data returned from the second mobile unit to the first mobile unit;

a second mobile unit having input means for inputting data, and third transmission/reception means for receiving the second request signal and returning the data inputted by the input means in accordance with the second request signal to the base station;

wherein the base station has storage means for storing the data returned from the second mobile unit; and wherein the storage means stores a plurality of route information on which the first mobile unit traveled in the past, and the search means of the base station extracts route information which overlaps the position information contained in the first request signal, from the plurality of route information, then predicts a traveling route of the first mobile unit on the basis of the extracted route information, and searches for the second mobile unit by using the predicted traveling route.

5. A data communication system comprising:

a first mobile unit having first transmission/reception means for transmitting a first request signal containing position information to a base station and receiving data corresponding to the first request signal from the base station;

a base station having search means for searching for a second mobile unit in accordance with the position information contained in the first request signal, and second transmission/reception means for receiving the first request signal, transmitting a second request signal to the second mobile unit thus searched for, and returning data returned from the second mobile unit to the first mobile unit;

a second mobile unit having input means for inputting data, and third transmission/reception means for receiving the second request signal and returning the data inputted by the input means in accordance with the second request signal to the base station;

wherein the search means of the base station predicts a traveling route of the first mobile unit on the basis of the position information contained in the first request signal, and searches for the second mobile unit by using the predicted traveling route; and wherein the search means of the base station searches for the second mobile unit on the basis of the information of the traveling route of the first mobile unit as the position information contained in the first request signal.

6. A data communication system comprising:

a first mobile unit having first transmission/reception means for transmitting a first request signal containing position information to a base station and receiving data corresponding to the first request signal;

a base station having search means for searching for a second mobile unit in accordance with the position information contained in the first request signal, and second transmission/reception means for receiving the first request signal and transmitting a second request signal containing information related to the first mobile unit to the second mobile unit thus searched for; and a second mobile unit having input means for inputting data, and third transmission/reception means for receiving the second request signal and returning the data inputted by the input means in accordance with the second request signal to the first mobile unit;

wherein the second mobile unit has storage means for storing the data inputted by the input means and the second mobile unit reads out data corresponding to the second request signal from data stored in the storage means in the past and returns the data to the first mobile unit.

7. The data communication system as claimed in claim 6, wherein the search means of the base station predicts a traveling route of the first mobile unit on the basis of the position information contained in the first request signal, and searches for the second mobile unit by using the predicted traveling route.

8. The data communication system as claimed in claim 7, wherein the search means of the base station searches for the second mobile unit on the basis of the information of the traveling route of the first mobile unit as the position information contained in the first request signal.

9. The data communication system as claimed in claim 6, wherein the first mobile unit has selection means for selecting desired data from a plurality of data received in accordance with the first request signal.

10. A data communication system comprising:
a first mobile unit having first transmission/reception means for transmitting a first request signal containing position information to a base station and receiving data corresponding to the first request signal;
a base station having search means for searching for a second mobile unit in accordance with the position information contained in the first request signal, and second transmission/reception means for receiving the first request signal and transmitting a second request signal containing information related to the first mobile unit to the second mobile unit thus searched for; and
a second mobile unit having input means for inputting data, and third transmission/reception means for receiving the second request signal and returning the data inputted by the input means in accordance with the second request signal to the first mobile unit,
wherein the second mobile unit has storage means for storing the data inputted by the input means; and
wherein the storage means stores a plurality of route information on which the first mobile unit traveled in the past, and the search means of the base station extracts route information which overlaps the position information contained in the first request signal, from the plurality of route information, then predicts a traveling route of the first mobile unit on the basis of the extracted route information, and searches for the second mobile unit by using the predicted traveling route.

11. A data communication system comprising:
a first mobile unit having first transmission/reception means for transmitting a first request signal containing position information to a base station and receiving data corresponding to the first request signal from the base station;
a base station having search means for searching for a second mobile unit in accordance with the position information contained in the first request signal, second transmission/reception means for receiving the first request signal, transmitting a second request signal to the second mobile unit thus searched for, and returning data returned from the second mobile unit to the first mobile unit, storage means for storing accounting information of users corresponding at least to the first and second mobile units, and control means for performing control to update the accounting information of the users corresponding to the first and second mobile units stored by the storage means; and
a second mobile unit having input means for inputting data, and third transmission/reception means for receiving the second request signal and returning the data inputted by the input means in accordance with the second request signal to the base station.

12. The data communication system as claimed in claim 11, wherein the base station has storage means for storing the data returned from the second mobile unit.

13. The data communication system as claimed in claim 12, wherein the base station reads out data corresponding to the first request signal from data stored in the storage means in the past and returns the data to the first mobile unit.

14. The data communication system as claimed in claim 11, wherein the search means of the base station predicts a traveling route of the first mobile unit on the basis of the position information contained in the first request signal, and searches for the second mobile unit by using the predicted traveling route.

15. The data communication system as claimed in claim 14, wherein the search means of the base station searches for the second mobile unit on the basis of the information of the traveling route of the first mobile unit as the position information contained in the first request signal.

16. The data communication system as claimed in claim 11, wherein the first mobile unit has selection means for selecting desired data from a plurality of data received in accordance with the first request signal.

17. A data communication system comprising:
a first mobile unit having first transmission/reception means for transmitting a first request signal containing position information to a base station and receiving data corresponding to the first request signal from the base station;
a base station having search means for searching for a second mobile unit in accordance with the position information contained in the first request signal, second transmission/reception means for receiving the first request signal, transmitting a second request signal to the second mobile unit thus searched for, and returning data returned from the second mobile unit to the first mobile unit, storage means for storing accounting information of users corresponding at least to the first and second mobile units, and control means for performing control to update the accounting information of the users corresponding to the first and second mobile units stored by the storage means;
wherein the control means performs updating to reduce amount information of accounting information including amount information and account information corresponding to the first mobile unit so that accounting is made to the first mobile unit; and
a second mobile unit having input means for inputting data, and third transmission/reception means for receiving the second request signal and returning the data inputted by the input means in accordance with the second request signal to the base station.

18. The data communication system as claimed in claim 17, wherein the control means performs updating to increase amount information of accounting information including amount information and account information corresponding to the second mobile unit so that compensation corresponding to the data returned to the base station is paid to the second mobile unit.

19. The data communication system as claimed in claim 18, wherein the control means transmits accounting information including an identifier, amount information and account number corresponding to the first mobile unit, and accounting information including an identifier, amount information and account number corresponding to the second mobile unit, to an accounting center via the second transmission/reception means.

20. A data communication system comprising:
a first mobile unit having first transmission/reception means for transmitting a first request signal containing position information to a base station and receiving data corresponding to the first request signal from the base station;
a base station having search means for searching for a second mobile unit in accordance with the position information contained in the first request signal, second transmission/reception means for receiving the first request signal, transmitting a second request signal to the second mobile unit thus searched for, and returning data returned from the second mobile unit to the first mobile unit, storage means for storing accounting information of users corresponding at least to the first and second mobile units, and control means for performing control to update the accounting information of the users corresponding to the first and second mobile units stored by the storage means; and a second mobile unit having input means for inputting data, and third transmission/reception means for receiving the second request signal and returning the data inputted by the input means in accordance with the second request signal to the base station;

wherein the base station has storage means for storing the data returned from the second mobile unit; and wherein the storage means stores a plurality of route information on which the first mobile unit traveled in the past, and the search means of the base station extracts route information which overlaps the position information contained in the first request signal, from the plurality of route information, then predicts a traveling route of the first mobile unit on the basis of the extracted route information, and searches for the second mobile unit by using the predicted traveling route.

21. A mobile device comprising:
position information acquisition means for acquiring position information;
signal generation means for generating a first request signal containing the position information;
input means for inputting data;
communication means for communicating a signal to/from an external device;
wherein when requesting data from the external device, the communication means transmits the first request signal containing the position information to the external device and receives data returned from the external device in accordance with the first request signal; and
when providing data to the external device, the communication means receives a second request signal transmitted from the external device and returns data inputted by the input means in accordance with the second request signal to the external device;
prediction means for predicting a traveling route of the mobile device from the position information, and the information of the traveling route is contained in the position information; and
storage means for storing a plurality of route information on which the mobile device traveled in the past;
wherein the prediction means extracts route information which overlaps the position information of the mobile device acquired by the position information acquisition means, from the plurality of route information, then predicts a traveling route of the mobile device on the basis of the extracted route information, and updates the position information of the mobile device to the information of the predicted traveling route.

22. The mobile device as claimed in claim 21, further comprising selection means for selecting desired data from a plurality of data received in accordance with the first request signal.

23. The mobile device as claimed in claim 21, further comprising setting means for setting the transferability of the data inputted by the input means to the external device.

24. A mobile device comprising:
position information acquisition means for acquiring position information;
signal generation means for generating a first request signal containing the position information;
input means for inputting data;
communication means for communicating a signal to/from an external device or another mobile device;
prediction means for predicting a traveling route of the mobile device from the position information, and the information of the traveling route is contained in the position information; and
storage means for storing a plurality of route information on which the mobile device traveled in the past;
wherein when requesting data obtained by another mobile device, the communication means transmits the first request signal containing the position information to the external device and receives data returned from said another mobile device in accordance with the first request signal;
when providing data to another mobile device, the communication means receives a second request signal containing information related to said another mobile device transmitted from the external device and returns data inputted by the input means in accordance with the second request signal to said another mobile device; and
wherein the prediction means extracts route information which overlaps the position information of the mobile device acquired by the position information acquisition means, from the plurality of route information, then predicts a traveling route of the mobile device on the basis of the extracted route information, and updates the position information of the mobile device to the information of the predicted traveling route.

25. The mobile device as claimed in claim 24, further comprising selection means for selecting desired data from a plurality of data received in accordance with the first request signal.

26. The mobile device as claimed in claim 24, further comprising setting means for setting the transferability of the data inputted by the input means to said another mobile device.

27. A server device comprising:
communication means capable of communicating a signal to/from a plurality of mobile units;
holding means for holding information related to the plurality of mobile units;
search means for searching for a second mobile unit corresponding to position information contained in a first request signal transmitted from a first mobile unit by using the information related to the plurality of mobile units held by the holding means;
generation means for generating a second request signal to be transmitted to the second mobile unit thus searched for;
wherein the second request signal is transmitted to the second mobile unit thus searched for and data returned from the second mobile unit is returned to the first mobile unit; and
storage means for storing the data returned from the second mobile unit;
wherein data corresponding to the first request signal is read out from data stored in the storage means in the past and is returned to the first mobile unit.

28. The server device as claimed in claim 27, wherein the search means predicts a traveling route of the first mobile unit on the basis of the position information contained in the first request signal, and searches for the second mobile unit by using the predicted traveling route.

29. The server device as claimed in claim 28, wherein the search means searches for the second mobile unit on the basis of the information of the traveling route of the first mobile unit as the position information contained in the first request signal.

30. A server device comprising:
communication means capable of communicating a signal to/from a plurality of mobile units;
holding means for holding information related to the plurality of mobile units;
search means for searching for a second mobile unit corresponding to position information contained in a first request signal transmitted from a first mobile unit by using the information related to the plurality of mobile units held by the holding means;
generation means for generating a second request signal to be transmitted to the second mobile unit thus searched for; and
storage means for storing the data returned from the second mobile unit;
wherein the holding means stores a plurality of route information on which the first mobile unit traveled in the past, and the search means extracts route information which overlaps the position information contained in the first request signal from the plurality of route information, then predicts a traveling route of the first mobile unit on the basis of the extracted route information, and searches for the second mobile unit by using the predicted traveling route; and
wherein the second request signal is transmitted to the second mobile unit thus searched for and data returned from the second mobile unit is returned to the first mobile unit.

31. A server device comprising:
communication means capable of communicating a signal to/from a plurality of mobile units;
holding means for holding information related to the plurality of mobile units;
search means for searching for a second mobile unit corresponding to position information contained in a first request signal transmitted from a first mobile unit by using the information related to the plurality of mobile units held by the holding means;
wherein the holding means stores a plurality of route information on which the first mobile unit traveled in the past, and the search means extracts route information which overlaps the position information contained in the first request signal from the plurality of route information, then predicts a traveling route of the first mobile unit on the basis of the extracted route information, and searches for the second mobile unit by using the predicted traveling route; and
generation means for generating a second request signal containing information related to the first mobile unit which is to be transmitted to the second mobile unit thus searched for;
wherein the second request signal is transmitted to the second mobile unit thus searched for.

32. The server device as claimed in claim 31, wherein the search means predicts a traveling route of the first mobile unit on the basis of the position information contained in the first request signal, and searches for the second mobile unit by using the predicted traveling route.

33. The server device as claimed in claim 32, wherein the search means searches for the second mobile unit on the basis of the information of the traveling route of the first mobile unit as the position information contained in the first request signal.

34. A server device comprising:
communication means capable of communicating a signal to/from a plurality of mobile units;
holding means for holding information related to the plurality of mobile units;
search means for searching for a second mobile unit corresponding to position information contained in a first request signal transmitted from a first mobile unit by using the information related to the plurality of mobile units held by the holding means;
generation means for generating a second request signal to be transmitted to the second mobile unit thus searched for;
storage means for storing accounting information of users corresponding at least to the first and second mobile units; and
control means for performing control to update the accounting information of the users corresponding to the first and second mobile units stored by the storage means;
wherein the control means updates the accounting information of the users corresponding to the first and second mobile units on the basis of data returned from the second mobile unit in accordance with the second request signal and data transmitted to the first mobile unit in accordance with the first request signal.

35. The server device as claimed in claim 34, wherein the control means performs updating to reduce amount information of accounting information including amount information and account information corresponding to the first mobile unit so that accounting is made to the first mobile unit.

36. The server device as claimed in claim 35, wherein the control means performs updating to increase amount information of accounting information including amount information and account information corresponding to the second mobile unit so that compensation corresponding to the data returned to the server device is paid to the second mobile unit.

37. The server device as claimed in claim 36, wherein the control means transmits accounting information including an identifier, amount information and account number corresponding to the first mobile unit, and accounting information including an identifier, amount information and account number corresponding to the second mobile unit, to an accounting center via the communication means.

38. The server device as claimed in claim 34, further comprising storage means for storing the data returned from the second mobile unit.

39. The server device as claimed in claim 38, wherein the control means reads out data corresponding to the first request signal from data stored in the storage means in the past and returns it to the first mobile unit.

40. The server device as claimed in claim 38, wherein the holding means stores a plurality of route information on which the first mobile unit traveled in the past, and the search means extracts route information which overlaps the position information contained in the first request signal from the plurality of route information, then predicts a traveling route of the first mobile unit on the basis of the extracted route information, and searches for the second mobile unit by using the predicted traveling route.

41. The server device as claimed in claim 34, wherein the search means predicts a traveling route of the first mobile unit on the basis of the position information contained in the first request signal, and searches for the second mobile unit by using the predicted traveling route.

42. The server device as claimed in claim 41, wherein the search means searches for the second mobile unit on the basis of the information of the traveling route of the first mobile unit as the position information contained in the first request signal.

43. A data communication system for carrying out communication among a first mobile unit, a second mobile unit and a base station, the first mobile unit comprising first communication means for transmitting a first request signal containing the position information of the first mobile unit to the base station and receiving data corresponding to the first request signal from the base station, the base station comprising prediction means for predicting the position of the first mobile unit after a predetermined time from the position information of the first mobile unit contained in the first request signal, search means for searching for the second mobile unit on the periphery of the position of the first mobile unit after the predetermined time predicted by the prediction means, and second communication means for receiving the first request signal, transmitting a second request signal to the second mobile unit thus searched for, and returning image data returned from the second mobile unit to the first mobile unit, the second mobile unit comprising image pickup means for picking up an image of an external object and outputting image data, and third communication means for receiving the second request signal and returning the image data outputted from the image pickup means to the base station.

44. A data communication method comprising the steps of:

transmitting a first request signal containing position information from a first mobile unit to a base station;

searching for a second mobile unit in accordance with the position information contained in the first request signal at the base station;

transmitting a second request signal from the base station to the second mobile unit thus searched for;

returning data inputted in accordance with the second request signal from the second mobile unit to the base station;

transmitting the data returned from the second mobile unit to the base station in accordance with the second request signal, from the base station to the first mobile unit as data corresponding to the first request signal; and storing the data returned from the second mobile unit and reading out data corresponding to the first request signal and returning the data to the first mobile unit.

45. A data communication method comprising the steps of:

transmitting a first request signal containing position information from a first mobile unit to a base station;

searching for a second mobile unit in accordance with the position information contained in the first request signal at the base station;

transmitting a second request signal to the second mobile unit thus searched for from the base station;

transmitting data inputted in accordance with the second request signal from the second mobile unit to the first mobile unit as data corresponding to the first request signal; and storing the data returned from the second mobile unit and reading out data corresponding to the first request signal and returning the data to the first mobile unit.

46. A data communication method comprising the steps of:

transmitting a first request signal containing position information from a first mobile unit to a base station;

searching for a second mobile unit in accordance with the position information contained in the first request signal at the base station;

transmitting a second request signal from the base station to the second mobile unit thus searched for;

returning data inputted in accordance with the second request signal from the second mobile unit to the base station;

transmitting the data returned from the second mobile unit to the base station in accordance with the second request signal, from the base station to the first mobile unit as data corresponding to the first request signal; and updating accounting information of users corresponding to the first and second mobile units on the basis of the data returned from the second mobile unit in accordance with the second request signal and the data transmitted to the first mobile unit in accordance with the first request signal.

47. A data communication method comprising the steps of:

when requesting data from an external device, acquiring position information; and transmitting a first request signal containing the position information to the external device; and when providing data to an external device, receiving a second request signal transmitted from the external device; and returning the data inputted in accordance with the second request signal to the external device;

predicting a traveling route of a mobile device from the position information, and the information of the traveling route is contained in the position information; and storing a plurality of route information on which the mobile device traveled in the past;

wherein the route information which overlaps the position information of the mobile device is extracted from predicting said traveling route of said mobile device, and then predicting a traveling route of the mobile device on the basis of the extracted route information, and updating the position information of the mobile device to the information of the predicted traveling route.

48. A data communication method comprising the steps of:

when requesting data acquired at another mobile device, acquiring position information;

transmitting a first request signal containing the position information to an external device; and receiving data transmitted from said another mobile device in accordance with the first request signal; and when providing data to another mobile device, receiving a second request signal containing information related to said another mobile device transmitted from an external device; and returning the data inputted in accordance with the second request signal to said another mobile device;

predicting a traveling route of the mobile device from the position information, and the information of the traveling route is contained in the position information; and storing a plurality of route information on which the mobile device traveled in the past;

wherein the route information which overlaps the position information of the mobile device is extracted from predicting said traveling route of said mobile device, and then predicting a traveling route of the mobile device on the basis of the extracted route information, and updating the position information of the mobile device to the information of the predicted traveling route.

49. A data communication method comprising the steps of:

searching for a second mobile unit corresponding to position information contained in a first request signal transmitted from a first mobile unit in accordance with information related to a plurality of mobile units;

generating a second request signal to be transmitted to the second mobile unit thus searched for;

transmitting the second request signal to the second mobile unit thus searched for;

transmitting data returned from the second mobile unit to the first mobile unit; and storing the data returned from the second mobile unit;

wherein data corresponding to the first request signal is read out from data stored in the storage means in the past and is returned to the first mobile unit.

50. A data communication method comprising the steps of:

searching for a second mobile unit corresponding to position information contained in a first request signal transmitted from a first mobile unit in accordance with information related to a plurality of mobile units;

generating a second request signal containing information related to the first mobile unit to be transmitted to the second mobile unit thus searched for;

transmitting the second request signal to the second mobile unit thus searched for; and storing the data returned from the second mobile unit;

wherein data corresponding to the first request signal is read out from data stored in the storage means in the past and is returned to the first mobile unit.

51. A data communication method comprising the steps of:

searching for a second mobile unit corresponding to position information contained in a first request signal transmitted from a first mobile unit in accordance with information related to a plurality of mobile units;

generating a second request signal to be transmitted to the second mobile unit thus searched for; and updating accounting information of users corresponding to the first and second mobile units stored in storage means on the basis of data returned from the second mobile unit in accordance with the second request signal and data transmitted to the first mobile unit in accordance with the first request signal.

52. A program storage medium in which a program readable by information processing means is stored, the program comprising:

a step of transmitting a first request signal containing position information from a first mobile unit to a base station;

a step of searching for a second mobile unit in accordance with the position information contained in the first request signal at the base station;

a step of transmitting a second request signal from the base station to the second mobile unit thus searched for;

a step of returning data inputted in accordance with the second request signal from the second mobile unit to the base station;

a step of transmitting the data returned from the second mobile unit to the base station in accordance with the second request signal, from the base station to the first mobile unit as data corresponding to the first request signal; and storing the data returned from the second mobile unit and reading out data corresponding to the first request signal and returning the data to the first mobile unit.

53. A program storage medium in which a program readably by information processing means is stored, the program comprising:

a step of transmitting a first request signal containing position information from a first mobile unit to a base station;

a step of searching for a second mobile unit in accordance with the position information contained in the first request signal at the base station;

a step of transmitting a second request signal from the base station to the second mobile unit thus searched for;

a step of transmitting data inputted in accordance with the second request signal from the second mobile unit to the first mobile unit as data corresponding to the first request signal; and storing the data returned from the second mobile unit and reading out data corresponding to the first request signal and returning the data to the first mobile unit.

54. A program storage medium in which a program readably by information processing means is stored, the program comprising:

a step of transmitting a first request signal containing position information from a first mobile unit to a base station;

a step of searching for a second mobile unit in accordance with the position information contained in the first request signal at the base station;

a step of transmitting a second request signal from the base station to the second mobile unit thus searched for;

a step of returning data inputted in accordance with the second request signal from the second mobile unit to the base station;

a step of transmitting the data returned from the second mobile unit to the base station in accordance with the second request signal, from the base station to the first mobile unit as data corresponding to the first request signal; and a step of updating accounting information of users corresponding to the first and second mobile units on the basis of the data returned from the second mobile unit in accordance with the second request signal and the data transmitted to the first mobile unit in accordance with the first request signal.

55. A program storage medium in which a program readably by information processing means is stored, the program comprising:

when requesting data from an external device,
a step of acquiring position information;
a step of transmitting a first request signal containing position information to the external device; and
a step of receiving the data transmitted from the external device in accordance with the first request signal; and when providing data to an external device,
a step of receiving a second request signal transmitted from the external device; and
a step of returning the data inputted in accordance with the second request signal to the external device;
predicting a traveling route of a mobile device from the position information, and the information of the traveling route is contained in the position information; and
storing a plurality of route information on which the mobile device traveled in the past;
wherein the route information which overlaps the position information of the mobile device is extracted from predicting said traveling route of said mobile device, and then predicting a traveling route of the mobile device on the basis of the extracted route information, and updating the position information of the mobile device to the information of the predicted traveling route.

56. A program storage medium in which a program readably by information processing means is stored, the program comprising:

when requesting data obtained by another mobile device,
a step of acquiring position information;
a step of transmitting a first request signal containing position information to an external device; and
a step of receiving the data transmitted from said another mobile device in accordance with the first request signal; and when providing data to another mobile device,
a step of receiving a second request signal containing information related to another mobile unit transmitted from an external device; and
a step of returning data inputted in accordance with the second request signal to said another mobile device;
predicting a traveling route of the mobile device from the position information, and the information of the traveling route is contained in the position information; and
storing a plurality of route information on which the mobile device traveled in the past;
wherein the route information which overlaps the position information of the mobile device is extracted from predicting said traveling route of said mobile device, and then predicting a traveling route of the mobile device on the basis of the extracted route information, and updating the position information of the mobile device to the information of the predicted traveling route.

57. A program storage medium in which a program readable by information processing means is stored, the program comprising:
a step of searching for a second mobile unit corresponding to position information contained in a first request signal transmitted from a first mobile unit in accordance with information related to a plurality of mobile units;
a step of generating a second request signal to be transmitted to the second mobile unit thus searched for;
a step of transmitting the second request signal to the second mobile unit thus searched for; and
a step of transmitting data returned from the second mobile unit to the first mobile unit; and
storing the data returned from the second mobile unit;
wherein data corresponding to the first request signal is read out from data stored in the storage means in the past and is returned to the first mobile unit.

58. A program storage medium in which a program readable by information processing means is stored, the program comprising:
a step of searching for a second mobile unit corresponding to position information contained in a first request signal transmitted from a first mobile unit in accordance with information related to a plurality of mobile units;
a step of generating a second request signal containing information related to the first mobile unit to be transmitted to the second mobile unit thus searched for; and
a step of transmitting the second request signal to the second mobile unit thus searched for; and
storing the data returned from the second mobile unit;
wherein data corresponding to the first request signal is read out from data stored in the storage means in the past and is returned to the first mobile unit.

59. A program storage medium in which a program readable by information processing means is stored, the program comprising:
a step of searching for a second mobile unit corresponding to position information contained in a first request signal transmitted from a first mobile unit in accordance with information related to a plurality of mobile units;
a step of generating a second request signal to be transmitted to the second mobile unit thus searched for; and
a step of updating accounting information of users corresponding to the first and second mobile units stored in storage means on the basis of data returned from the second mobile unit in accordance with the second request signal and data transmitted to the first mobile unit in accordance with the first request signal.

* * * * *